(12) United States Patent
Uchiyama et al.

(10) Patent No.: US 8,373,692 B2
(45) Date of Patent: Feb. 12, 2013

(54) LIGHT MODULATOR, PROJECTION DISPLAY APPARATUS AND IMAGE PROJECTION METHOD

(75) Inventors: Yuji Uchiyama, Yokohama (JP); Masato Furuya, Yokohama (JP); Tatsuru Kobayashi, Yokohama (JP); Ryo Nishima, Yokohama (JP); Motoshi Tohda, Yokohama (JP); Yoshio Fukuzaki, Yokohama (JP); Takeshi Makabe, Yokohama (JP); Yasuo Ishizaka, Yokohama (JP); Akihiro Hamaguchi, Yokohama (JP)

(73) Assignee: JVC Kenwood Corporation, Yokohama-Shi, Kanagawa (JP)

( * ) Notice: Subject to any disclaimer, the term of this patent is extended or adjusted under 35 U.S.C. 154(b) by 1064 days.

(21) Appl. No.: 12/319,997

(22) Filed: Jan. 14, 2009

(65) Prior Publication Data
US 2009/0179882 A1    Jul. 16, 2009

(30) Foreign Application Priority Data

Jan. 16, 2008   (JP) .................................. 2008-6856
Aug. 29, 2008   (JP) ............................... 2008-221198

(51) Int. Cl.
| | |
|---|---|
| G03B 21/14 | (2006.01) |
| G03B 21/26 | (2006.01) |
| G03B 21/28 | (2006.01) |
| G02B 26/00 | (2006.01) |
| G02B 26/08 | (2006.01) |
| G02B 5/30 | (2006.01) |
| G02F 1/03 | (2006.01) |

(52) U.S. Cl. .............. 345/207; 353/20; 353/30; 353/81; 353/82; 359/237; 359/239; 359/242; 359/298; 359/301; 359/485.01

(58) Field of Classification Search .................... 345/96, 345/207; 359/237, 239, 242, 246, 298, 301, 359/485.01
See application file for complete search history.

(56) References Cited

U.S. PATENT DOCUMENTS

| | | | | |
|---|---|---|---|---|
| 5,738,429 A | * | 4/1998 | Tagawa et al. ................ | 353/122 |
| 2006/0231794 A1 | * | 10/2006 | Sakaguchi et al. ....... | 252/299.61 |
| 2007/0002466 A1 | * | 1/2007 | Kobayashi et al. ........... | 359/740 |
| 2007/0115237 A1 | * | 5/2007 | Hirakata ......................... | 345/96 |

FOREIGN PATENT DOCUMENTS
JP   2006-319950   11/2006

* cited by examiner

*Primary Examiner* — Alexander Eisen
*Assistant Examiner* — Mark Regn
(74) *Attorney, Agent, or Firm* — Renner, Kenner, Grieve, Bobak, Taylor & Weber

(57) ABSTRACT

A first linearly polarized bundle of rays of incident rays is converted by optical modulation with an input video signal into a second linearly polarized bundle of rays orthogonal to the first rays in polarization. The first rays pass through a polarizer before optically modulated. A second linearly polarized bundle of rays originally involved in the incident rays is reflected by the polarizer in a first direction. The second rays obtained by the optical modulation are reflected by the polarizer in a second direction. The second rays reflected in the second direction pass through another polarizer. A first linearly polarized bundle of rays involved in the reflected second rays is reflected by the other polarizer. The reflected first rays is detected by an optical sensor that is positioned outside an optical path of the second rays originally involved in the incident rays and reflected in the first direction.

13 Claims, 16 Drawing Sheets

LIGHT MODULATOR, PROJECTION DISPLAY APPARATUS AND IMAGE PROJECTION METHOD

CROSS-REFERENCE TO RELATED APPLICATIONS

This application is based on and claims the benefit of priority from the prior Japanese Patent Application Nos. 2008-006856 filed on Jan. 16, 2008, and 2008-221198 filed on Aug. 29, 2008, the entire contents of which is incorporated herein by reference.

BACKGROUND OF THE INVENTION

The present invention relates to a light modulator, a projection display apparatus and an image projection method that achieve higher image quality for images projected onto a screen while restrict flickers that occur due to asymmetric waveforms of AC voltages applied to electrodes that face each other in a liquid crystal display device.

Projection display apparatuses have a mechanism in which light is emitted from a light source to a liquid crystal display device that forms an optical image corresponding to an input video signal, which is then projected onto a screen.

One factor that affects the quality of images projected onto a screen in projection display apparatuses is the electro-optical conversion performance of a liquid crystal display device driven by input video signals.

A liquid crystal display device is equipped with: a common electrode; a large number of pixel electrodes arranged as facing the common electrode and each being controlled by an associated drive transistor; and a liquid crystal filled between the common electrode and each pixel electrode. A voltage to be applied across the common electrode and each pixel electrode is an AC voltage that is reversed in polarity per frame or line period.

The AC voltage waveform, however, suffers asymmetric deformation between the positive and negative polarities when applied across the common electrode and each pixel electrode. The following are several factors related to the asymmetric deformation: variation in the characteristics of drive transistors used in driving pixel electrodes; variation in the electro-optical characteristics of liquid crystals; variation in the condition of liquid crystals in alignment; and contamination of impurities to liquid crystals; and difference in materials between the common electrode and the pixel electrodes that face each other.

Such an asymmetric-waveform AC voltage causes a common-electrode voltage to be shifted from the center voltage of the AC voltage that is being alternately reversed in polarity with respect to the center voltage. The common-electrode voltage (referred to as Vcom, hereinafter) is a DC voltage to be applied to the common electrode. The shifted DC voltage is then supplied to the liquid crystal display device, thus resulting in flickers occurring on projected images.

When flickers occur on projected images, they cause the images to suffer higher black levels which lead to lower contrast and narrower display gradation. Moreover, while flickers are occurring, DC voltages being supplied to the liquid crystal display device cause ionic substances involved in liquid crystals to be pulled to either of the common or pixel electrode. Such a phenomenon leads to burning on the liquid crystal display device, resulting in lower operational reliability of the display device.

In order to overcome such problems, the US patent application publication No. 2006/0231794 A1 (referred to as Citation 1, hereinafter) discloses a technique to restrict occurrence of flickers with adjustments to the voltage Vcom (referred to as V com-adjustments, hereinafter) to be applied to the common electrode.

A projection display apparatus disclosed in Citation 1 is equipped with: a light source; liquid crystal display devices for forming an optical image in accordance with an input video signal when light is emitted thererto from the light source; an optical system with a projection lens for enlarging and projecting the optical image onto a screen (each liquid crystal display device being installed in the optical system); an optical sensor for detecting the intensity of the light after emitted to each liquid crystal display device; a drive circuit for driving each display device; and a control circuit for controlling the drive circuit based on the detected intensity.

Such an optical sensor is used for detecting flickers, or an unsteady light that goes on and off quickly. In Citation 1, the optical sensor is provided at an outer edge of the screen or in the optical system.

The projection display apparatus disclosed in Citation 1 displays optical images on a screen, as explained below.

When light is generated from the light source and emitted to each liquid crystal display device, an optical image is formed at each display device in accordance with an input video signal. The optical image is supplied to the optical system through which the image is enlarged and projected onto a screen provided at a specific location including a focal point.

When Vcom-adjustments start to restrict flickers, a raster test pattern signal pre-stored in the drive circuit is supplied to each liquid crystal display device which forms a raster pattern image. The raster pattern image is then projected onto the screen via the projection lens of the optical system.

The variation in intensity of light that carries the raster pattern image is detected by the optical sensor provided at the outer edge of the screen or in the optical system. The detected variation in intensity indicates flicker leveles on the projected raster pattern image, which enables calculation of a Vcom level to be applied to the common electrode of each liquid crystal display device at which level flickers are restricted. The voltage Vcom is then adjusted to the calculated Vcom level by the control circuit so that flickers cannot be observed on the projected images.

However, the known projection display apparatus of Citation 1 has the following disadvantages due to the optical sensor provided at an outer edge of the screen or in the optical system.

When the optical sensor is provided at an outer edge of the screen, it cannot detect enough optical intensity for Vcom-adjustments because the outer edge of the screen is always at a black level during image projection. Higher accuracy of the Vcom-adjustments requires several optical sensors to be provided at outer edges of the screen with integration of signals detected by the optical sensors to give larger amplitude to the detected signals or a longer measuring period at the optical sensors to gain higher accumulated optical intensity. The arrangements of several optical sensors, however, require wider space at the outer edges of the screen and the integration of detected signals causes a longer Vcom-adjustment period. A longer measuring period also leads to a longer Vcom-adjustment period.

Moreover, when the known projection display apparatus is reinstalled in another place, the optical sensor provided at the outer edge of the screen is also required to be reinstalled at other parts of the outer edges of the screen. Thus, reinstallation cannot be done easily.

When the optical sensor is installed in the optical system of the known projection display apparatus, it must be located on the optical path from the liquid crystal display device in the optical system to the screen, which may result in the shade of the optical sensor being projected onto the screen.

Moreover, installation of the optical sensor in the optical system causes a higher cost for the optical system. Because the installed sensor requires reinstallation when the projection lens is replaced with another one depending on the installation space for the known projection display apparatus.

Furthermore, the known projection display apparatus has to perform the Vcom-adjustments with sequential irradiation of R-, G- and B-rays onto the optical sensor if only one sensor is installed or with irradiation of white light if the optical sensors for the colors of R, G and B are installed. The single optical sensor requires three times of irradiation of R-, G- and B-rays, which results in a longer Vcom-adjustment period. Installation of the optical sensors for the colors of R, G and B causes increase in the number of sensors and the installation space, which results in difficulty in reinstallation of the optical sensors when the projection display apparatus is moved to another place.

Furthermore, the known projection display apparatus requires the optical sensor(s) to be located in the optical path as being apart as much as possible from the center of the optical path in the optical system so that no adverse effects of the shade of optical sensor(s) are given to the projected images. Thus, the Vcom-adjustments must be performed with measurements of optical intensity at an outer edge of a projected image and hence cannot restrict flickers over the entire projected image when flickers irregularly occur over the display area of each liquid crystal display device.

Moreover, flickers that occur on projected images involve a flicker so-called a lamp flicker of light discharged from the light source depending on the temperature of the electrode of the light source and the surface conditions of the electrode, in addition to an unadjusted Vcom level. The known projection display apparatus inevitably performs excessive Vcom-adjustments to the flickers involving the lamp flicker, which may result in failure of the Vcom-adjustments, or incomplete flicker elimination.

SUMMARY OF THE INVENTION

A purpose of the present invention is to provide a light modulator, a projection display apparatus and an image projection method that can avoid projection of the shade of an optical sensor on projected images, with easer reinstallation and a lower cost for a projection lens.

Another purpose of the present invention is to provide a light modulator, a projection display apparatus and an image projection method with accurate and short-time Vcom-adjustments with a few number of optical sensors.

Still, another purpose of the present invention is to provide a light modulator, a projection display apparatus and an image projection method that can restrict flickers even if the flickers irregularly occur over a projected image and also can restrict flickers caused by the insufficient performance of liquid crystal display devices, separately from lamp flickers.

The present invention provides an optical modulator comprising: a liquid crystal display device to convert a first linearly polarized-state bundle of rays, with optical modulation based on an input video signal, into a second linearly polarized-state bundle of rays that is orthogonal to the first linearly polarized-state bundle of rays in polarization, the first linearly polarized-state bundle of rays being involved in incident bundle of rays obtained by polarization conversion of a bundle of rays emitted from a light source and being incident on the optical modulator; a reflective polarizer to allow the first linearly polarized-state bundle of rays to pass therethrough before the first linearly polarized-state bundle of rays is optically modulated by the liquid crystal display device whereas reflect a second linearly polarized-state bundle of rays originally involved in the incident bundle of rays in a first direction and reflect the second linearly polarized-state bundle of rays obtained by the optical modulation in a second direction different from the first direction; a transparent polarizer to allow the second linearly polarized-state bundle of rays reflected by the reflective polarizer in the second direction to pass therethrough whereas reflect a first linearly polarized-state bundle of rays involved in the second linearly polarized-state bundle of rays reflected in the second direction; and an optical sensor to detect the first linearly polarized-state bundle of rays reflected by the transparent polarizer, the optical sensor being positioned outside an optical path of the second linearly polarized-state bundle of rays originally involved in the incident bundle of rays and reflected by the reflective polarizer in the first direction.

Moreover, the present invention provides a projection display apparatus comprising: a color separator to separate a white light emitted from a light source into bundles of red, green, and blue rays; a polarization converter to convert the bundles of red, green and blue rays into a first linearly polarized-state bundle of red rays, a first linearly polarized-state bundle of green rays, and a first linearly polarized-state bundle of blue rays, by beam splitting and polarization conversion; optical modulators to optically modulate the first linearly polarized-state bundles of red, green, and blue rays into second linearly polarized-state bundles of red, green, and blue rays, respectively, based on an input video signal carrying images; a color combiner to combine the second linearly polarized-state bundles of red, green, and blue rays into a combined second linearly polarized-state bundle of rays; and a projection lens via which the combined second linearly polarized-state bundle of rays is enlarged and projected onto a screen for displaying the images, wherein each optical modulator includes: a liquid crystal display device to convert each of the first linearly polarized-state bundles of red, green, and blue rays, with optical modulation based on the input video signal, into a second linearly polarized-state bundle of rays that is orthogonal to each of the first linearly polarized-state bundles of red, green, and blue rays in polarization; a reflective polarizer to allow each of the first linearly polarized-state bundles of red, green, and blue rays to pass therethrough before each of the first linearly polarized-state bundles of red, green, and blue rays is optically modulated by the liquid crystal display device whereas reflect a second linearly polarized-state bundle of rays involved in the each of the first linearly polarized-state bundles of red, green, and blue rays in a first direction and reflect the second linearly polarized-state bundle of rays obtained by the optical modulation in a second direction different from the first direction; a transparent polarizer to allow the second linearly polarized-state bundle of rays reflected by the reflective polarizer in the second direction to pass therethrough whereas reflect a first linearly polarized-state bundle of rays involved in the second linearly polarized-state bundle of rays reflected in the second direction, the second linearly polarized-state bundle of rays allowed to pass through the transparent polarizer being supplied to the color combiner; and an optical sensor to detect the first linearly polarized-state bundle of rays reflected by the transparent polarizer, the optical sensor being positioned outside an optical path of the second linearly polarized-state bundle of rays involved in each of the first linearly polarized-state bundles of red, green, and blue rays and reflected by the reflective polarizer in the first direction.

Furthermore, the present invention provides an image projection method for projecting images onto a screen by using a projection display apparatus equipped with a liquid crystal display device having pixel electrodes and a common electrode provided as facing the pixel electrodes, a liquid crystal driver for driving the liquid crystal display device and outputting a polarity switching signal for each vertical period of the images, and an optical sensor for outputting a detection signal when detecting light from the liquid crystal display device, the light being not used for projecting the images, the method comprising the steps of: separating the detection signal into a detection signal component in a positive side in polarity and another detection signal component in a negative side in polarity for each vertical period based on the polarity switching signal; obtaining peak levels of the detection signal components to output a differential signal that indicates a difference between the peak levels; calculating an adjusted common-electrode voltage to be supplied to the common electrode of the liquid crystal display device; supplying the adjusted common-electrode voltage to the common electrode for projecting the images onto the screen, wherein the adjusted common-electrode voltage is calculated with the differential signal and a prior common-electrode voltage calculated for a previous vertical period.

Still, furthermore, the present invention provides an image projection method for projecting images onto a screen by using a projection display apparatus equipped with a liquid crystal display device for modulation of incident light and having pixel electrodes and a common electrode provided as facing the pixel electrodes, an optical sensor for detecting light from the liquid crystal display device, the light being not used for projecting the images, and a memory for storing data related to a common-electrode voltage to be supplied to the common electrode, the method comprising the steps of: obtaining a first common-electrode adjusting voltage for the common electrode when the projection display apparatus is turned on for an m-th time (m being an integer of 1 or more); obtaining a second common-electrode adjusting voltage for the common electrode when the projection display apparatus is turned off for the m-th time; obtaining a variant of a common-electrode adjusting voltage from a difference between the first and second common-electrode adjusting voltages, the variant of the common-electrode adjusting voltage thus obtained being stored in the memory; obtaining a third common-electrode adjusting voltage for the common electrode when the projection display apparatus is turned on for a (m+1)-th time; adding the variant of the common-electrode adjusting voltage stored in the memory to the third common-electrode adjusting voltage, the third common-electrode adjusting voltage thus added with the variant being set as a common-electrode voltage to be supplied to the common electrode; and supplying the set common-electrode voltage to the common electrode of the liquid crystal display device for projecting the images onto the screen.

DETAILED DESCRIPTION OF PREFERRED EMBODIMENTS

In the following disclosure and throughout the drawings, the same or analogous elements or components are given the same numerals or signs, overlapping description being omitted if not necessary.

Moreover, in the following disclosure, the term "a bundle of rays" may be interpreted as "luminous flux". Furthermore, the term "ray" is referred to as "beam" when polarization is concered.

Figure 1:
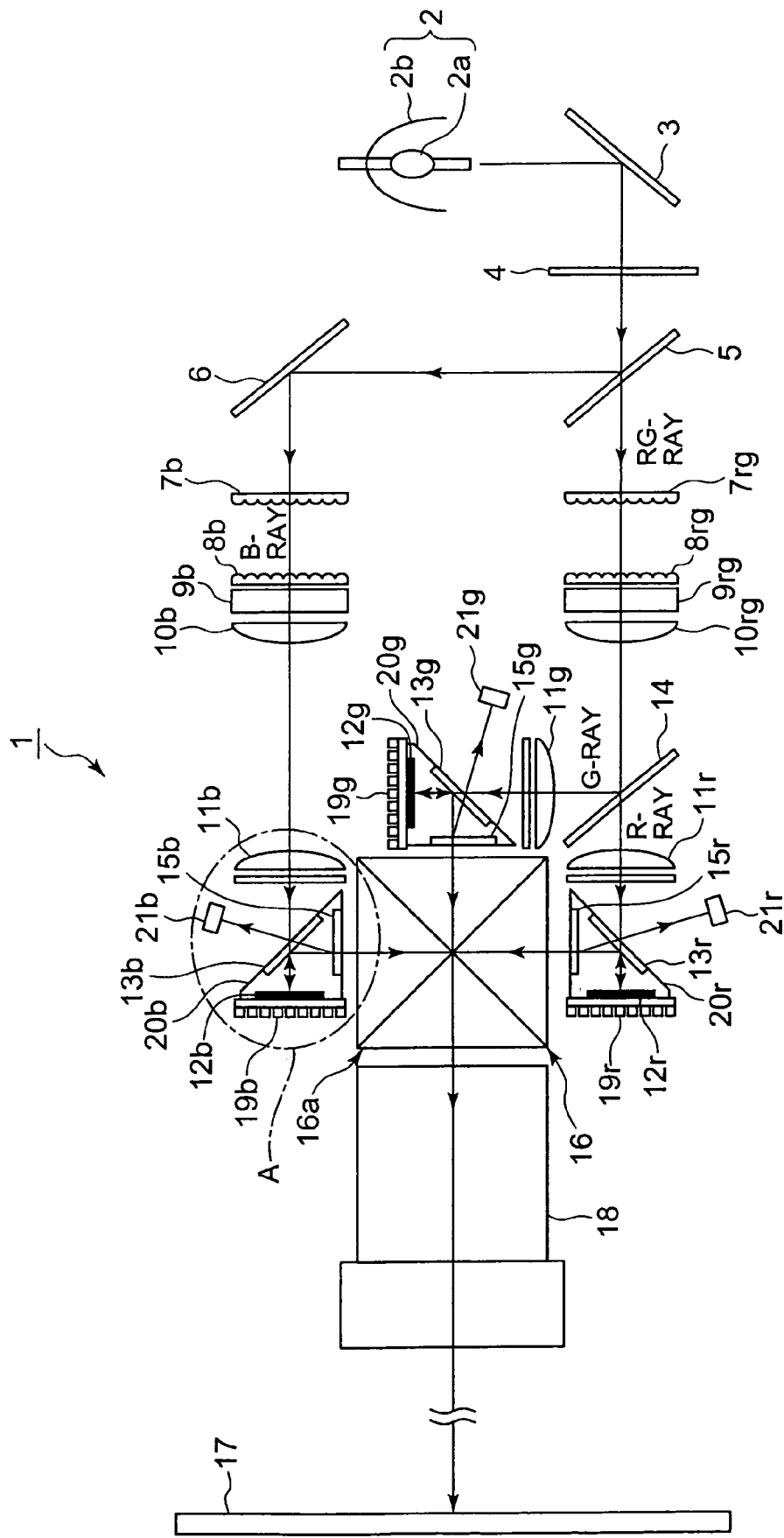
FIG. 1 shows a schematic illustration of an optical system of a projection display apparatus, as a preferred embodiment of the present invention.

FIG. 1 shows a schematic illustration of an optical system of a projection display apparatus 1, as a preferred embodiment of the present invention.

As shown in FIG. 1, the optical system of the projection display apparatus 1 is equipped with: a light source 2 having a xenon lamp 2a and a concave mirror 2b; an infrared-ray pass filter 3 that allows an infrared ray to pass therethrough while reflects the other rays; an ultraviolet-ray reflection filter 4 that reflects an ultraviolet ray while allows the other rays to pass therethrough; and a B-dichroic mirror 5 that separates an incident light by reflecting a blue ray (referred to as a B-ray, hereinafter) while allowing a red-green ray (referred to as a RG-ray, hereinafter) to pass therethrough, provided in the order on the optical path of the light emitted from the light source 2.

Moreover, the optical system is equipped with, on the path of the B-ray reflected by the B-dichroic mirror 5: a reflection mirror 6 that reflects the B-ray at an angle of 90 degrees; a first fly-eye lens 7b; a second fly-eye lens 8b; a polarization converter 9b; a condenser lens 10b; a field lens 11b; a reflective polarizer 13b; and a reflective liquid crystal display device 12b for B-ray that optically modulates linearly polarized beams incident thereon, reflects and emits a bundle of rays with polarization being changed due to optical modulation. The explanation will be given later to the first fly-eye lens 7b, the second fly-eye lens 8b, the polarization converter 9b, the condenser lens 10b, the field lens 11b, and the reflective polarizer 13b.

Furthermore, the optical system is equipped with, on the path of the RG-ray reflected by the B-dichroic mirror 5: a first fly-eye lens 7rg; a second fly-eye lens 8rg; a polarization converter 9rg; a condenser lens 10rg; and a RG-dichroic mirror 14 that separates an incident light by reflecting a green ray (referred to as a G-ray, hereinafter) while allowing a red ray (referred to as a R-ray, hereinafter) to pass therethrough. The explanation will be given later to the first fly-eye lens 7rg, the second fly-eye lens 8rg, the polarization converter 9rg, and the condenser lens 10rg.

Moreover, the optical system is equipped with, on the path of the R-ray reflected by the RG-dichroic mirror 14: a field lens 11r; a reflective polarizer 13r; and a reflective liquid crystal display device 12r for R-ray that optically modulates linearly polarized beams incident thereon, reflects and emits a bundle of rays with polarization being changed due to optical modulation. The explanation will be given later to the field lens 11r and the reflective polarizer 13r.

Furthermore, the optical system is equipped with, on the path of the G-ray reflected by the RG-dichroic mirror 14: a field lens 11g; a reflective polarizer 13g; and a reflective liquid crystal display device 12g for R-ray that optically modulates a bundle of linearly polarized beams incident thereon, reflects and emits a bundle of beams with polarization being changed due to optical modulation. The explanation will be given later to the field lens 11g and the reflective polarizer 13g.

Now, the explanation is given to the fly-eye lenses 7b, 7rg, 8b and 8rg, the polarization converters 9b and 9rg, the condenser lenses 10b and 10rg, and the filed lenses 11r, 11g and 11b.

The first fly-eye lenses 7b and 7rg, and the second fly-eye lenses 8b and 8rg have the functions of: shaping the bundle of rays emitted from the light source 2 into the shape of the respectively corresponding reflective liquid crystal display devices 12b, 12r and 12g, and separating the incident bundle of rays into several sub-bundles of rays to provide uniform illuminance on the respectively corresponding reflective liquid crystal display devices 12b, 12r and 12g.

The polarization converters 9b and 9rg have the function of converting sub-bundles of randomly polarized beams into sub-bundles of one type of linearly polarized beams.

The condenser lenses 10b and 10rg have the function of combining the sub-bundles of the one type of linearly polarized beams converted by the polarization converters 9b and 9rg, respectively, into a single bundle of the one type of linearly polarized beams.

The field lenses 11r, 11g and 11b have the function of converting the single bundle of the one type of linearly polarized beams into telecentric illumination light.

The reflective polarizers 13r, 13g and 13b have the function of polarization-splitting the incident bundle of rays by allowing the rays therethrough or reflecting the rays, depending on the polarization state of the rays. In this embodiment, the reflective polarizers 13r, 13g and 13b allow the telecentric illumination light emitted from the field lenses 11r, 11g and 11b to pass therethrough, respectively, towards the reflective liquid crystal display devices 12r, 12g and 12b, respectively, and reflect the bundles of rays optically modulated by the devices 12r, 12g and 12b, respectively.

Provided at the rear surfaces of the reflective liquid crystal display devices 12r, 12g and 12b are heat sinks 19r, 19g and 19b, respectively, to prevent the devices 12r, 12g and 12b from being heat up due to the incident bundles of rays, which otherwise causes degraded electro-optical characteristics of the devices 12r, 12g and 12b.

Provided on the optical paths of the bundles of rays reflected by the reflective polarizers 13r, 13g and 13b are transparent polarizers 15r, 15g and 15b, respectively, that allow the bundles of rays of the colors R, G and B, to pass therethrough, respectively, while reflect and remove unwanted polarized beams from the passing bundle of rays, for higher degree of polarization, hence for higher contrast.

Provided on the optical paths of the bundles of rays of the colors R, G and B passing through the transparent polarizers 15r, 15g and 15b is a square-column-like cross dichroic prism 16 that combines the bundles of rays of the colors R, G and B incident thereon through three side faces and emits the combined bundle of rays through the remaining one side face.

Provided on the optical path of the combined bundle of rays is a projection lens 18 that enlarges and projects the combined rays onto a screen 17.

The reflective polarizers 13r, 13g and 13b, the reflective liquid crystal display devices 12r, 12g and 12b (mounted on the heat sinks 19r, 19g and 19b, respectively), and the transparent polarizers 15r, 15g and 15b are attached to three side faces of triangular prisms 20r, 20g and 20b, respectively.

Provided outside the triangular prisms 20r, 20g and 20b and on the optical paths of the unwanted polarized beams reflected by the transparent polarizers 15r, 15g and 15b are optical sensors 21r, 21g and 21b, respectively. The sensors 21r, 21q and 21b convert incident light into electric detection depending on the light intensity, the detection signals carrying voltages, currents, frequencies, etc., each corresponding to the light intensity.

The function of the optical system of the projection display apparatus 1 will be explained with reference to FIGS. 1 to 3.

Installed in the light source 2 is the xenon lamp 2a that emits a highly intense bundle of rays that exhibits steep bright-line spectrum in the infrared range.

The light source 2 then emits such rays of high intensity to the infrared-ray pass filter 3 that is provided at an angle of 45 degrees to the optical path of the incident rays. The filter 3 allows an infrared ray of a wavelength of about 700 nm or higher of the emitted rays to pass therethrough, thus the infrared ray is eliminated, whereas reflects the other rays of a wavelength of about 700 nm or lower, at an angle of 90 degrees.

The bundle of rays with no infrared ray as being eliminated by the infrared-ray pass filter 3 is incident on the ultraviolet-ray pass filter 4. The filter 4 reflects an ultraviolet ray of a wavelength of about 400 nm or shorter towards the light source 2, whereas allows the rays with no infrared and ultraviolet rays thus eliminated to pass therethrough.

The bundle of rays that has passed through the ultraviolet-ray pass filter 4 is incident on the B-dichroic mirror 5 that is provided at an angle of 45 degrees to the optical path of the incident rays. The mirror 5 separates the incident bundle of rays by reflecting a B-ray while allowing a RG-ray to pass therethrough.

The bundle of B-rays reflected by the B-dichroic mirror 5 is incident on the reflection mirror 6, that is provided at an angle of 45 degrees to the optical path of the incident rays, and reflected at an angle of 90 degrees.

The bundle of B-rays reflected by the reflection mirror 6 has a circular cross section in accordance with the shape of the concave mirror 2b of the light source 2 in cross section orthogonal to the direction of emission. The circular bundle of B-rays, however, requires to be converted into a rectangular bundle of rays so that it can be efficiently incident on an effective pixel area of the rectangular liquid crystal display device 12b.

Provided for use in such light conversion for the circular bundle of B-rays reflected by the reflection mirror 6 are: the first fly-eye lens 7b that has small rectangular convex lenses arranged in a matrix; and the second fly-eye lens 8b that also has small rectangular convex lenses arranged in a matrix and on the focal point of the lens 7b. The circular bundle of B-rays reflected by the mirror 6 is incident on the fly-eye lenses 7b and 8b and separated into several rectangular sub-bundles of B-rays with uniform illuminance over the sub-bundles.

The rectangular sub-bundles of B-rays emitted from the second fly-eye lens 8b are randomly polarized beams with no uniform polarization state. The randomly polarized beams of B-ray require to be converted into linearly polarized beams in a specific direction of polarization.

Provided for such random-to-linear polarization conversion is the polarization converter 9b that is a flat device with an array of polarization beam splitters each having a half wave plate that exhibits birefringence and provided on a specific part of a light-emitting surface of each splitter.

The randomly polarized beams of B-ray incident on the polarization converter 9b are separated into P- and S-polarized beam components through polarization beam splitting planes of the array of polarization beam splitters. The splitting planes are provided on the array such that they are arranged in parallel in a stripe at an angle of 45 degrees with respect to the main surface of the converter 9b.

When the randomly polarized beams of B-ray are incident on the polarization converter 9b, each P-polarized beam component of B-ray is allowed to pass through the associated polarization beam splitting plane and emitted from the converter 9b at the rear side whereas each S-polarized beam component of B-ray is reflected by the associated splitting plane at an angle of 90 degrees. Each reflected S-polarized beam component of B-ray is incident on the adjacent splitting plane and reflected again at an angle of 90 degrees. Each S-polarized beam component of B-ray reflected twice is emitted from the converter 9b at the rear side where the associated half wave plate is provided. The S-polarized beam component of B-ray is then subjected to polarization conversion while passing through the associated half wave plate so that its direction of polarization is turned by 90 degrees, and hence converted into a beam component polarized in a specific direction of polarization, that is a P-polarized beam component of B-ray, in this embodiment.

In a modification, the polarization converter 9b can be designed so that P-polarized beam components are converted into S-polarized beam components.

The sub-bundles of P-polarized beams of B-ray are then incident on the condenser lens 10b, by which they are combined into a single bundle of P-polarized beams of B-ray.

The single bundle of P-polarized beams emitted from the condenser lens 10b is incident on the field lens 11b, by which the beams are refracted in accordance with the size of an effective pixel area of the reflective liquid crystal display device 12b for B-ray.

Figure 2:
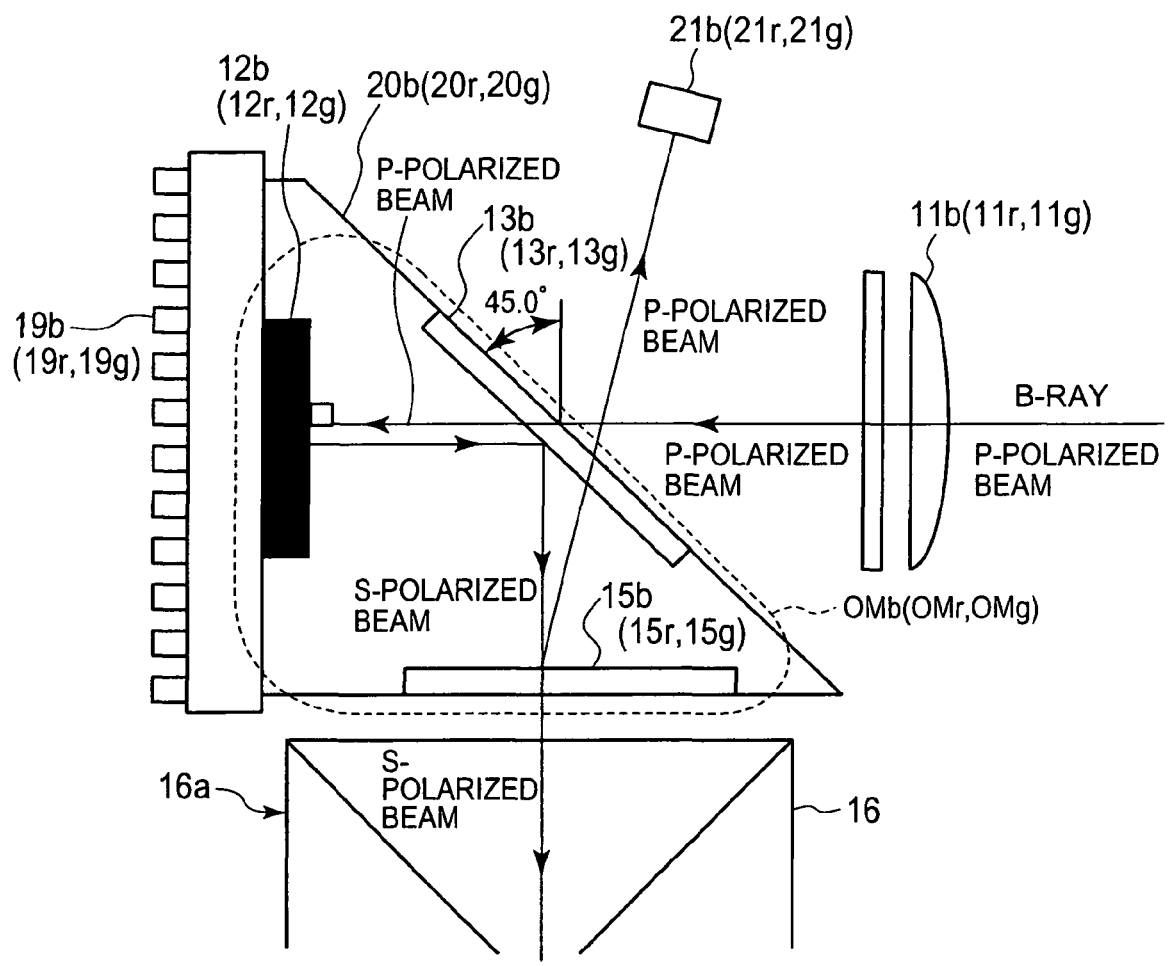
FIG. 2 shows a schematic illustration of an optical modulator installed in the projection display apparatus, according to the present invention.

The refracted bundle of B-rays is then incident on the reflective polarizer 13b attached to one side face of the triangular prism 20b, as being provided as inclined at 45 degrees to the optical path of B-ray, as illustrated in FIG. 2.

FIG. 2 is an enlarged view of a section A surrounded by a dash-dot line in FIG. 1 that is an optical modulator OMb for B-ray including the reflective liquid crystal display device 12b, the reflective polarizer 13b, and the transparent polarizer 15b, indicated as being surrounded by a dot line.

The illustration shown in FIG. 2 and the description below concerning the optical modulator OMb for B-ray is also applied to: an optical modulator OMr for R-ray including the reflective liquid crystal display device 12r, the reflective polarizer 13r, and the transparent polarizer 15r; and an optical modulator OMg for G-ray including the reflective liquid crystal display device 12g, the reflective polarizer 13g, and the transparent polarizer 15g.

When the bundle of B-rays is incident on the reflective polarizer 13b of the optical modulator OMb, its P-polarized beam components are allowed to pass therethrough whereas its small amount of S-polarized beam components are reflected at an angle of 90 degrees and emitted outside the triangular prism 20b.

The P-polarized beam components of B-ray that have passed through the reflective polarizer 13b are then incident on the reflective liquid crystal display device 12b for B-ray provided on the heat sink 19b that is mounted on a side face of the triangular prism 20b, as being orthogonal to the optical path of B-ray.

Figure 3:
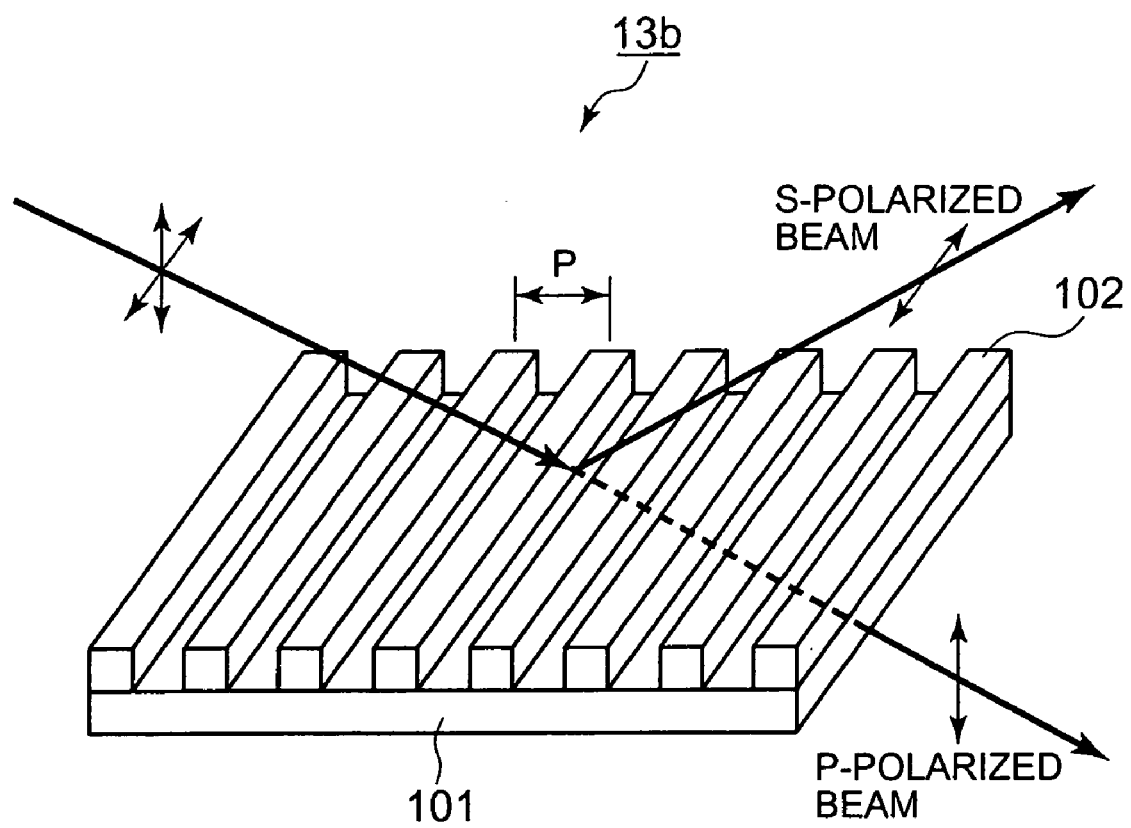
FIG. 3 shows a schematic illustration of a reflective polarizer installed in the projection display apparatus, according to the present invention, explaining the operational principle of the reflective polarizer.

As illustrated in FIG. 3, the reflective polarizer 13b consists of an array of wire grid polarizers. In detail, provided on an optical glass plate 101 are multiple wire grids 102 of aluminum, for example, each with a reflective surface, that are arranged in a stripe at a pitch (P) of about 140 nm. The polarizer 13b allows beam components polarized as being orthogonal to the grids 102 to pass therethrough, for example, P-polarized beam components in this embodiment, whereas reflects beam components polarized as being parallel to the grids 102, for example, S-polarized beam components in this embodiment. The polarizer 13b is a flat and light polarization beam splitting plate. Moreover, the polarizer 13b hardly absorbs light emitted from the light source 2 so that it can prevent decrease in quality of displayed images which otherwise occurs due to birefringence that occurs on the optical glass plate 101 when heated by the light. The above description and FIG. 3 concerning the reflective polarizer 13b is also applied to the reflective polarizer 13r and 13g.

The further optical procedures to be applied to the P-polarized beam components of B-ray incident on the reflective liquid crystal display device 12b for B-ray will be described later.

The functions of the optical system of the projection display apparatus 1 described above for the B-ray is similarly applied to the RG-ray emitted from the B-dichroic mirror 5 shown in FIG. 1, which will be described below briefly.

The circular bundle of RG-rays that is allowed to pass through and emitted from the B-dichroic mirror 5 is incident on the first and second fly-eye lenses 7rg and 8rg and separated into several rectangular sub-bundles of RG-rays with uniform illuminance over the sub-bundles.

The rectangular sub-bundles of RG-rays that are randomly polarized beams are incident on the polarization converter 9rg, by which they are converted into sub-bundles of P-polarized beams of RG-ray.

The sub-bundles of P-polarized beams of RG-ray emitted from the polarization converter 9rg are then incident on the condenser lens 10rg, by which they are combined into a single bundle of P-polarized beams of RG-ray.

The single bundle of P-polarized beams of RG-ray emitted from the condenser lens 10rg is incident on the dichrock mirror 14 that reflects G-rays while allows R-rays to pass therethrough, by which it is separated into the P-polarized beams of R-ray and the other P-polarized beams of G-ray.

The P-polarized beams of R-ray are incident on the optical modulator OMr including the reflective liquid crystal display device 12r, the reflective polarizer 13r, and the transparent polarizer 15r. The P-polarized beams of G-ray are incident on the optical modulator OMg including the reflective liquid crystal display device 12g, the reflective polarizer 13g, and the transparent polarizer 15g. The functions of the optical modulators OMr and OMg are the same as those explained for the optical modulator OMb with respect to FIG. 2.

The optical procedures to be applied to the P-polarized beam components of R- and G-rays incident on the optical modulators OMr and OMg, respectively, are the same as those applied to the P-polarized beam components of B-ray incident on the optical modulator OMb as described above, and hence explanation thereof being omitted for brevity.

The further optical procedures to be applied to the P-polarized beam components of R-, G- and B-rays incident on the reflective liquid crystal display devices 12r, 12g, and 12b, respectively, will be described below.

The P-polarized beam components of R-, G- and B-rays incident on the reflective liquid crystal display devices 12r, 12g, and 12b, respectively, are optically modulated with input video signals for the colors R, G and B, that realign the liquid crystals of the devices 12r, 12g, and 12b, respectively, when applied thereto.

The optically-modulated bundles of R-, G- and B-rays are reflected by and emitted from the reflective liquid crystal display devices 12r, 12g, and 12b, respectively, and incident on the reflective polarizers 13r, 13g and 13b, respectively, that are provided as inclined to the corresponding optical paths at an angle of 45 degrees, as illustrated in FIG. 2.

S-polarized beam components of the optically-modulated bundles of R-, G- and B-rays are then reflected by the reflective polarizers 13r, 13g and 13b, respectively, at an angle of 90 degrees and incident on the transparent polarizers 15r, 15g and 15b, respectively, that are an unwanted-polarized-beam removing means attached to one side face of the triangular prisms 20r, 20g and 20b, respectively.

The transparent polarizers 15r, 15g and 15b have the same structure as the reflective polarizers 13r, 13g and 13b shown in FIG. 3. However, the orientation of the multiple wire grids 102 of the transparent polarizers arranged in a stripe with respect to the incident optical path is different at an angle of 90 degrees from the orientation of the reflective polarizers. Thus, the transparent polarizers 15r, 15g and 15b have the function of removing unwanted P-polarized beam components from the incident S-polarized beams of R-, G- and B-rays, respectively, for higher contrast.

The S-polarized beams of R-, G- and B-rays that have passed through the transparent polarizers 15r, 15g and 15b are then incident on the cross dichroic prism 16 at three light incident planes (not a light emitting plane 16a in FIG. 2). The S-polarized beams of R-, G- and B-rays are combined into a bundle of R-, G- and B-rays by the prism 16 and emitted therefrom. The emitted bundle of R-, G- and B-rays are enlarged by the projection lens 18 and then projected onto the screen 17 to display enlarged images.

On the contrary, the unwanted P-polarized beam components of R-, G- and B-rays that have been reflected to be removed by the transparent polarizers 15r, 15g and 15b, respectively, reach optical sensors 21r, 21g and 21b, respectively, each sensor being provided outside the associated transparent polarizer 15r, 15q and 15b.

Figure 4:
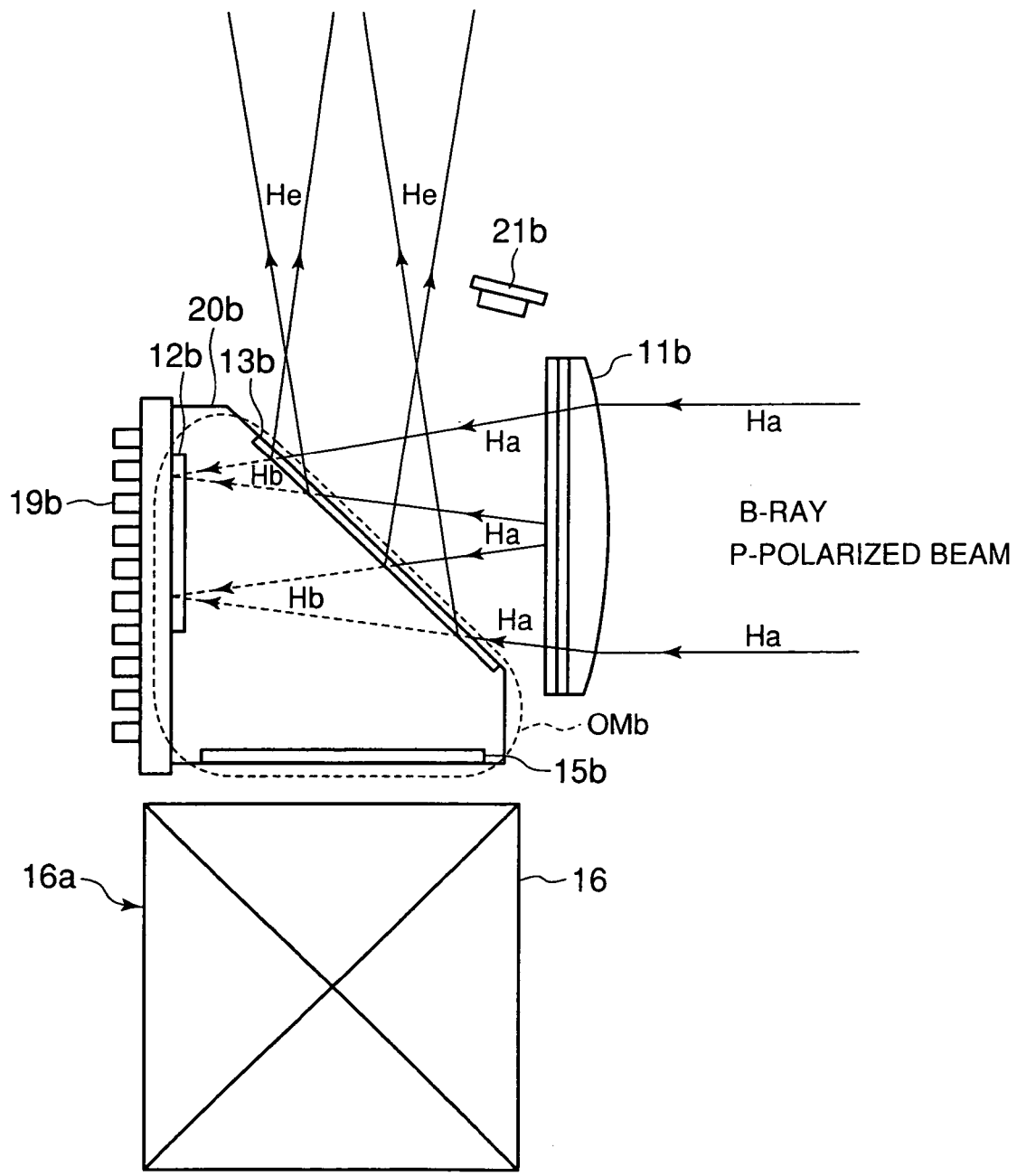
FIG. 4 shows a schematic illustration of an optical modulator installed in the projection display apparatus, according to the present invention, explaining the optical passages of light beams incident on and exiting from the optical modulator.
Figure 5:
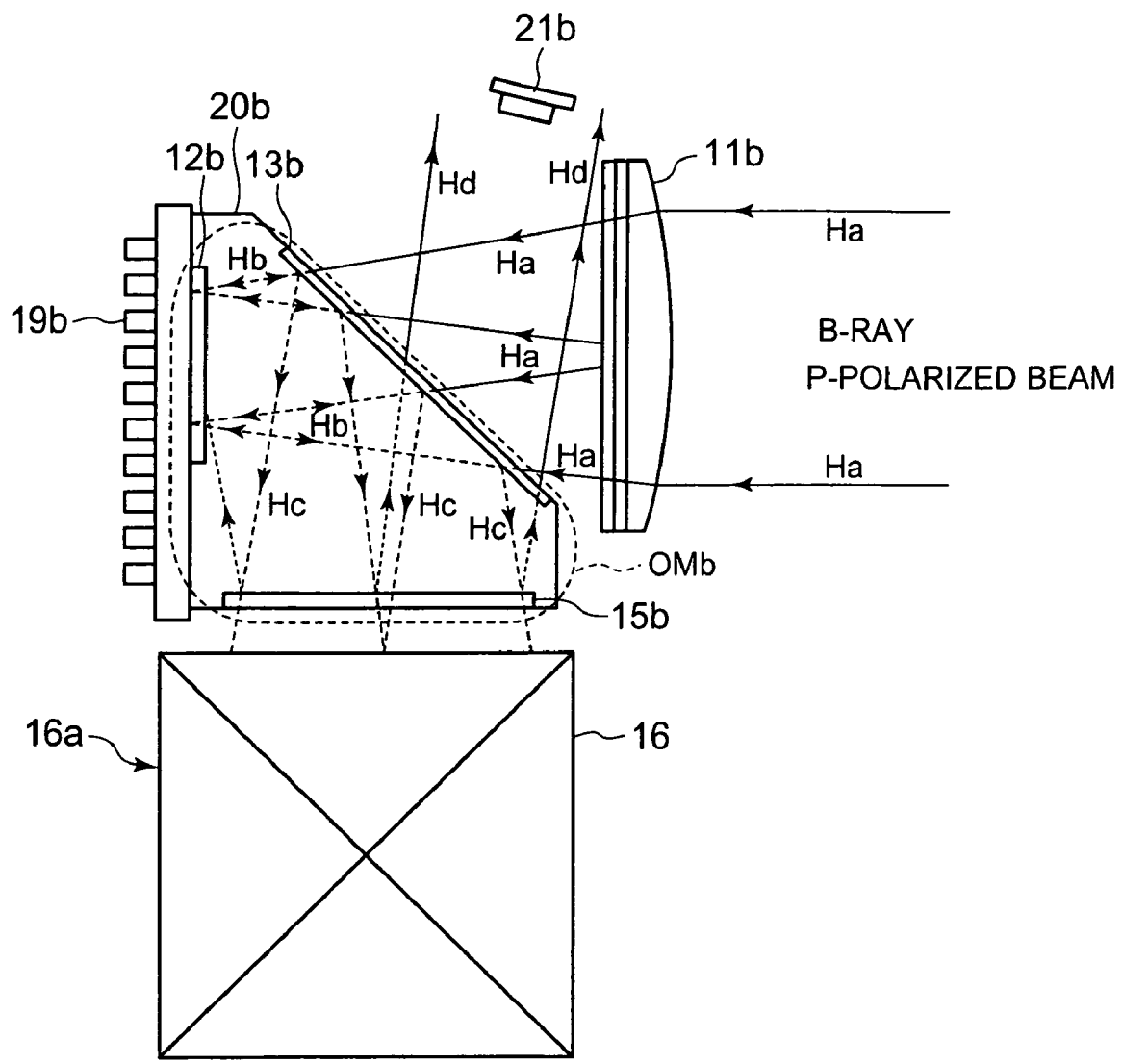
FIG. 5 shows a schematic illustration of an optical modulator installed in the projection display apparatus, according to the present invention, explaining the optical passages of light incident on and exiting from a reflective liquid crystal display apparatus of the optical modulator.

The location of the optical sensors 21r, 21g and 21b will be described in detail with respect to FIGS. 4 and 5 that illustrate optical paths in and outside the triangular prism 20r, 20g or 20b. Illustrated in FIGS. 4 and 5 are the optical paths for B-ray and the explanation will be focused on B-ray, the same being applied to G- and R-rays.

A bundle Ha of P-polarized beams of B-ray emitted from the condenser lens 10b (FIG. 1) is refracted in accordance with the size of an effective pixel area of the reflective liquid crystal display device 12b for B-ray when the bundle Ha passes through the field lens 11b.

The refracted bundle Ha of p-polarized beams of B-ray is then incident on the reflective polarizer 13b attached to one side face of the triangular prism 20b, as being provided as inclined at 45 degrees to the optical path of B-ray.

The reflective polarizer 13b allows P-polarized beams to pass therethrough. Thus, the bundle Ha that has passed through the polarizer 13b, indicated as a bundle Hb of P-polarized beams in FIGS. 4 and 5, is incident on the reflective liquid crystal display device 12b for B-ray. The incident bundle Hb of P-polarized beams is optically modulated by the device 12b into S-polarized beams (some beams remaining as P-polarized beams unchanged which depends on the optical modulation).

The modulated bundle Hb of S-polarized beams is then reflected by the reflective liquid crystal display device 12b for B-ray and incident on the reflective polarizer 13b by which it is reflected at an angle of 90 degrees.

The bundle Hb of S-polarized beams reflected by the reflective polarizer 13b, indicated as a bundle Hc of S-polarized beams in FIG. 5, is then incident on the transparent polarizer 15b by which S-polarized beams are allowed to pass therethrough whereas unwanted P-polarized beam components are reflected to be removed from the incident bundle Hc, for higher contrast.

The optical sensor 21b is provided at a specific location so that the unwanted P-polarized beam components reflected by the transparent polarizer 15b, indicated as a bundle Hd of P-polarized beams in FIG. 5, can reach the sensor 21b.

Concerning the location of the optical sensor 21b, the bundle Ha of P-polarized beams of B-ray emitted from the condenser lens 10b cannot completely pass through the reflective polarizer 13b, or some P-polarized beams are reflected by the polarizer 13b. Also reflected by the polarizer 13b are some S-polarized beams involved in the bundle Ha of P-polarized beams. These P- and S-polarized beams are reflected by the polarizer 13b at an angle of 90 degrees and emitted out from the triangular prism 20b, as a bundle He of rays as illustrated in FIG. 4.

The bundle He of rays emitted out from the triangular prism 20b has not been subjected to the optical modulation by the reflective liquid crystal display device 12b for B-ray. Thus, the bundle He of rays (FIG. 4) has not been affected by flickers that has occurred due to the optical modulation at the device 12b, and hence exhibits higher intensity than the bundle Hd of rays (FIG. 5) that has been reflected by the transparent polarizer 15b, after affected by such flickers as the bundle Hb (FIG. 5).

Therefore, the optical sensor 21b is required to be provided at a specific location where the bundle Hd of rays (FIG. 5) reflected by the transparent polarizer 15b can reach whereas the bundle He of rays (FIG. 4) reflected by the reflective polarizer 13b cannot reach.

Described next in detail is how to perform Vcom-adjustments using the optical sensors 21r, 21g and 21b.

The Vcom-adjustments are performed to obtain a voltage Vcom to be applied to a common electrode of each of the reflective liquid crystal display devices 12r, 12g and 12b for R-, G- and B-rays, respectively, when images to be projected are optically modulated by these display devices in accordance with input video signals. More specifically, the Vcom-adjustments are performed with a test image that is projected onto a screen to detect or determine an optimum voltage Vcom.

Figure 6:
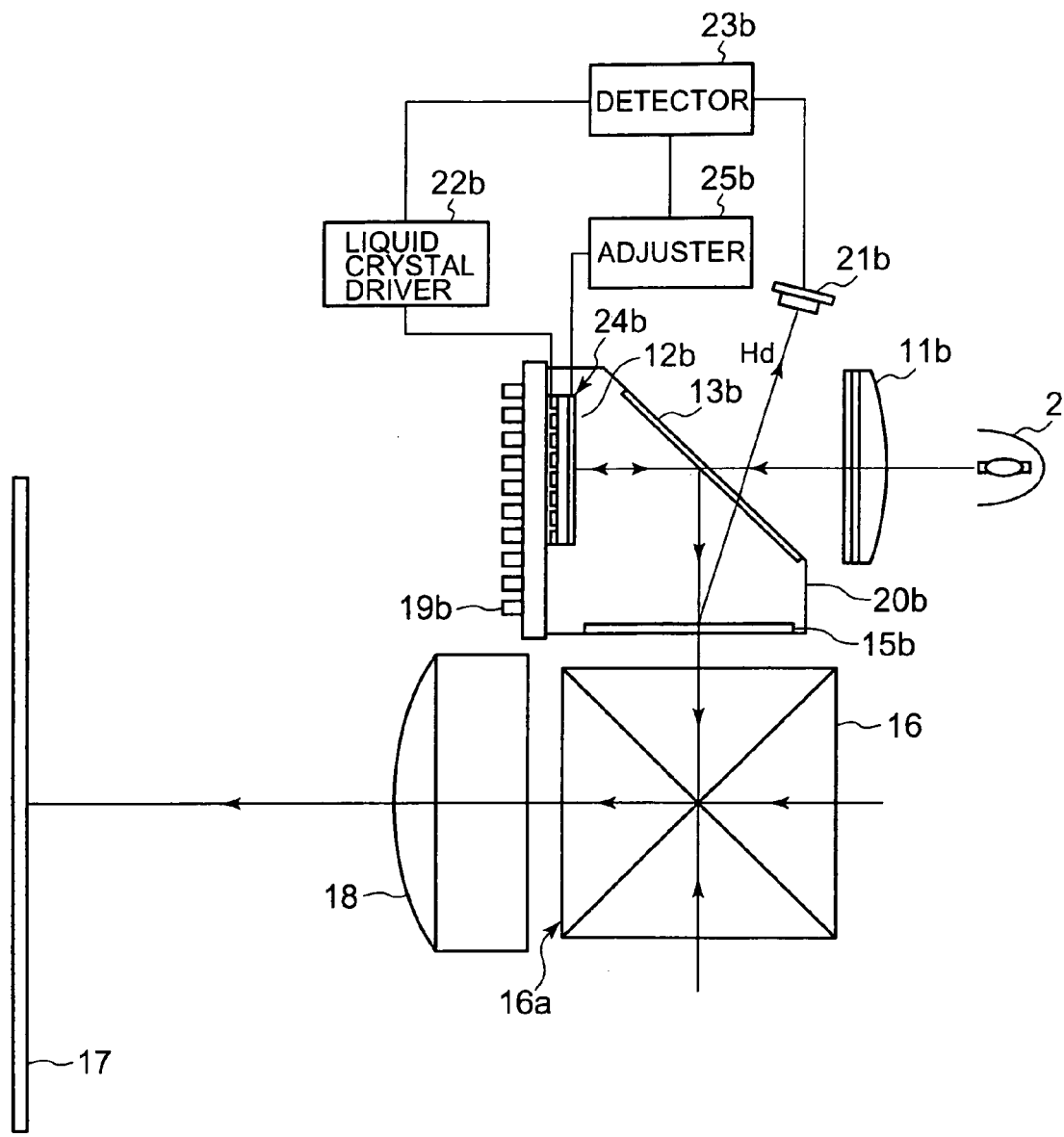
FIG. 6 shows is a Vcom-adjustment circuit for B-ray (the same being applied to G- and R-rays) installed in the projection display apparatus, according to the present invention.

FIG. 6 shows is a Vcom-adjustment circuit for B-ray, the same being applied to G- and R-rays.

As shown in FIG. 6, the Vcom-adjustment circuit for B-ray includes: the optical sensor 21b provided on the optical path of the bundle Hd (FIG. 5) of P-polarized beams reflected by the transparent polarizer 15b; a liquid crystal driver 22b for applying a drive signal to the reflective liquid crystal display device 12b for B-ray; a detector 23b for detecting a voltage Vcom based on a signal from the optical sensor 21b and the drive signal from the liquid crystal driver 22b; an adjuster 25b for calculating an optimum voltage Vcom based on the detected voltage Vcom and applying the optimum voltage Vcom to a common electrode 24b of the reflective liquid crystal display device 12b.

[Variation 1]

A first variation to the Vcom-adjustment circuit for B-ray will be described with reference to FIGS. 7 and 8, the same being applied to G- and R-rays.

The detector 23b (FIG. 6) includes an analog-to-digital converter (referred to as ADC, hereinafter) 26, a timing pulse generator (referred to as TG, hereinafter) 27, a positive-polarity data holder (referred to as DH-posi, hereinafter) 28, a negative-polarity data holder (referred to as DH-nega, hereinafter) 29, a subtractor A30; a coefficient register (referred to as DH-K, hereinafter) 31, a multiplier 32, and a multiplied-data holder (referred to as DH-DET-K, hereinafter) 33.

The adjuster 25b includes common-electrode voltage data holder (referred to as DH-CC, hereinafter) 34, a subtractor B35, and a digital-to-analog converter (referred to as DAC, hereinafter) 36.

The operation of the Vcom-adjustment circuit for B-ray shown in FIG. 7 will be described with reference to a flowchart shown in FIG. 8.

When the optical sensor 21b detects the bundle Hd (FIG. 5) of P-polarized beams reflected by the transparent polarizer 15b, it converts the intensity change of the bundle Hd into an analog electric detection signal that is sent to the ADC 26 to be converted into a digital detection signal (step S1).

While the optical sensor 21b is detecting the bundle Hd of P-polarized beams, the liquid crystal driver 22b receives: an input video signal and reverses the polarity of the video signal with respect to a reference voltage for each vertical period (referred to as frame, hereinafter) of succeeding images carried by the video signal; and supplies the video signal with the polarities reversed for each frame as a drive signal to pixel electrodes of the reflective liquid crystal display device 12b for B-ray. The liquid crystal driver 22b also generates a clock signal and a polarity switching signal per frame and supplies the signals to the TG 27. When the TG 27 receives the signals, it generates a positive trigger signal, a negative trigger signal, and a frame period signal that corresponds to one frame of an image to be projected (step S2).

The digital detection signal output from the ADC 26 is supplied to the DH-posi 28 and the DH-nega 29, and separated into positive and negative detection signal components and stored in the DH-posi 28 and the DH-nega 29, respectively, when the positive and negative trigger signals are also supplied to the DH-posi 28 and the DH-nega 29, respectively, from the TG 27 (step S3).

When the DH-posi 28 and DH-nega 29 have stored the positive and negative detection signal components, respectively, they output positive and negative peak detection signals, respectively, to the subtractor A30 by which subtraction is performed to the peak detection signals (step S4). Each detection signal indicates the highest or maximum level of the detection signal for each frame.

When the difference between the positive and negative peak detection signals is zero at the subtractor A30 (YES in step S5), it indicates no shift of the voltage Vcom and hence no Vcom-adjustments are required, thus the Vcom-adjustment procedure ends. On the contrary, if the difference is not zero (NO in step S5), the procedure goes to the further steps.

The differential data (≠0) obtained at the subtractor A30 is supplied to the multiplier 32 by which it is multiplied in accordance with a coefficient supplied by the DH-K 31 and stored in the DH-DET-33 (step S6). A larger coefficient can shorten a required Vcom-measurement time.

The differential data stored in the DH-DET-33 is then output as a differential signal once for each frame in accordance with the frame period signal, supplied from the TG 27, that corresponds to one frame of an imaged to be projected (step S7).

The differential signal (data) output from the DH-DET-33 is supplied to the subtractor B35 by which it is subjected to subtraction (Vcom-adjustment data calculation) with an output signal of the DH-CC 34, that is a one-frame prior subtraction-result signal of the subtractor B35 and has been stored in the DH-CC 34 (step S8). In detail, when the differential signal carries a positive polarity, it is subtracted from the one-frame prior subtraction-result signal (that is a one-frame prior voltage Vcom). On the contrary, when the differential signal carries a negative polarity, it is added to the one-frame prior subtraction-result signal.

A result of subtraction at the subtractor B35 is then stored (Vcom-adjustment data store) in DH-CC 34, as a one-frame prior subtraction-result signal, once for each frame in accordance with the frame period signal supplied from the TG 27 (step S9).

The result of subtraction at the subtractor B35 is also supplied to the DAC 36 by which it is converted from a digital to an analog signal (step S10).

The analog signal thus converted at the DAC 36, that carries an adjusted voltage Vcom, is then supplied to the common electrode 24b (FIG. 6) of the reflective liquid crystal display device 12b for B-ray (step S11).

The Vcom-adjustment procedure from step S1 for generation of a detection signal from the optical sensor 21b to step S11 for outputting an adjusted voltage Vcom to the common electrode 24b is performed for every frame until the difference becomes zero in step S5, thus restricting flickers that occur on projected images.

As described, the optical sensor 21b is provided at a specific location where the bundle Hd of rays (FIG. 5) reflected by the transparent polarizer 15b can reach whereas the bundle He of rays (FIG. 4) reflected by the reflective polarizer 13b cannot reach. In other words, the optical sensor 21b is provided at such a specific location so that the Vcom-adjustment procedure can be conducted with no effects of the bundle He of rays, to restrict flickers that occur on projected images.

The Vcom adjustments for B-ray described above are also performed for R- and G-rays with the identical circuits for R- and G-rays, respectively, to the Vcom-adjustment circuit for B-ray (FIG. 6), provided as being associated with the optical sensors 21r and 21g, respectively. Thus, the Vcom adjustments can be performed for each of R-, G- and B-rays in parallel for a short period.

Moreover, the optical sensors 21r, 21g and 21b are installed in the projection display apparatus 1 as shown in FIG. 1 which achieves a smaller size and higher mobility for the display apparatus 1.

[Variation 2]

Figure 9:
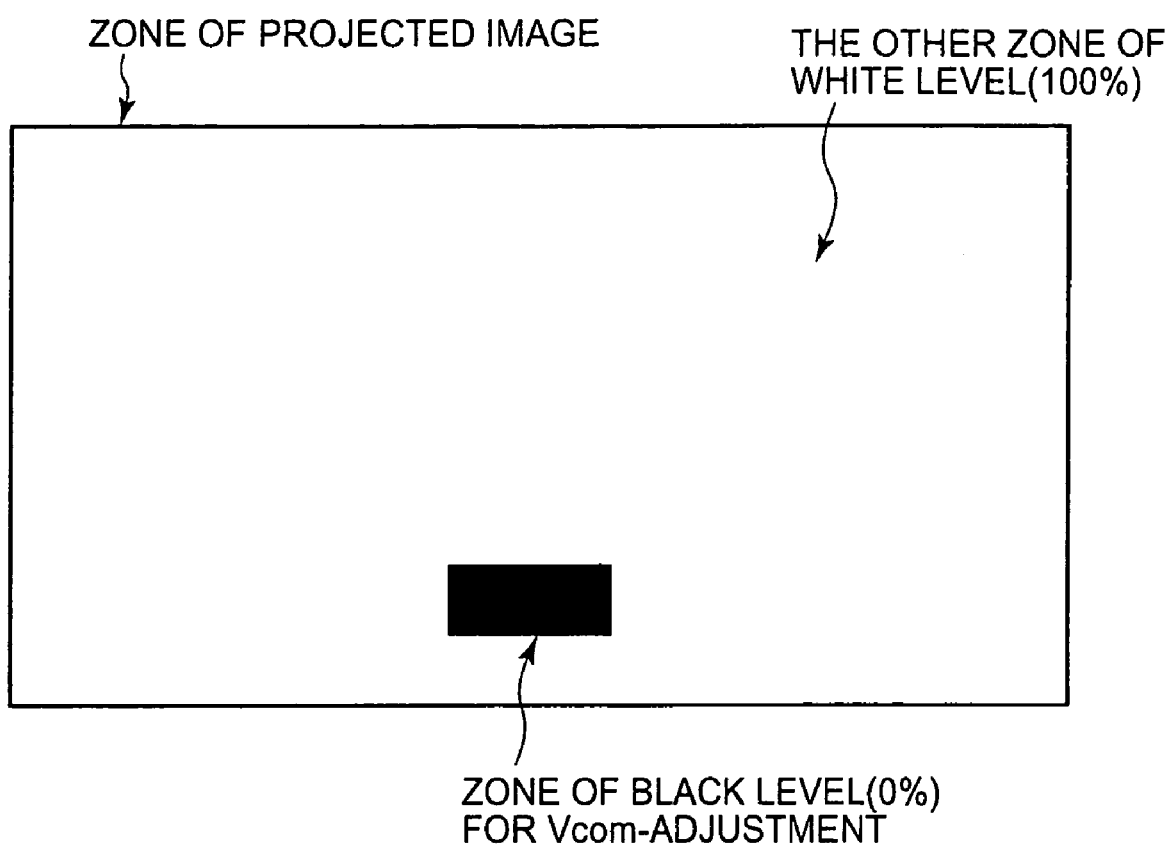
FIG. 9 shows an illustration that explains Vcom-adjustments to be performed to a specific zone of a projected image.
Figure 10:
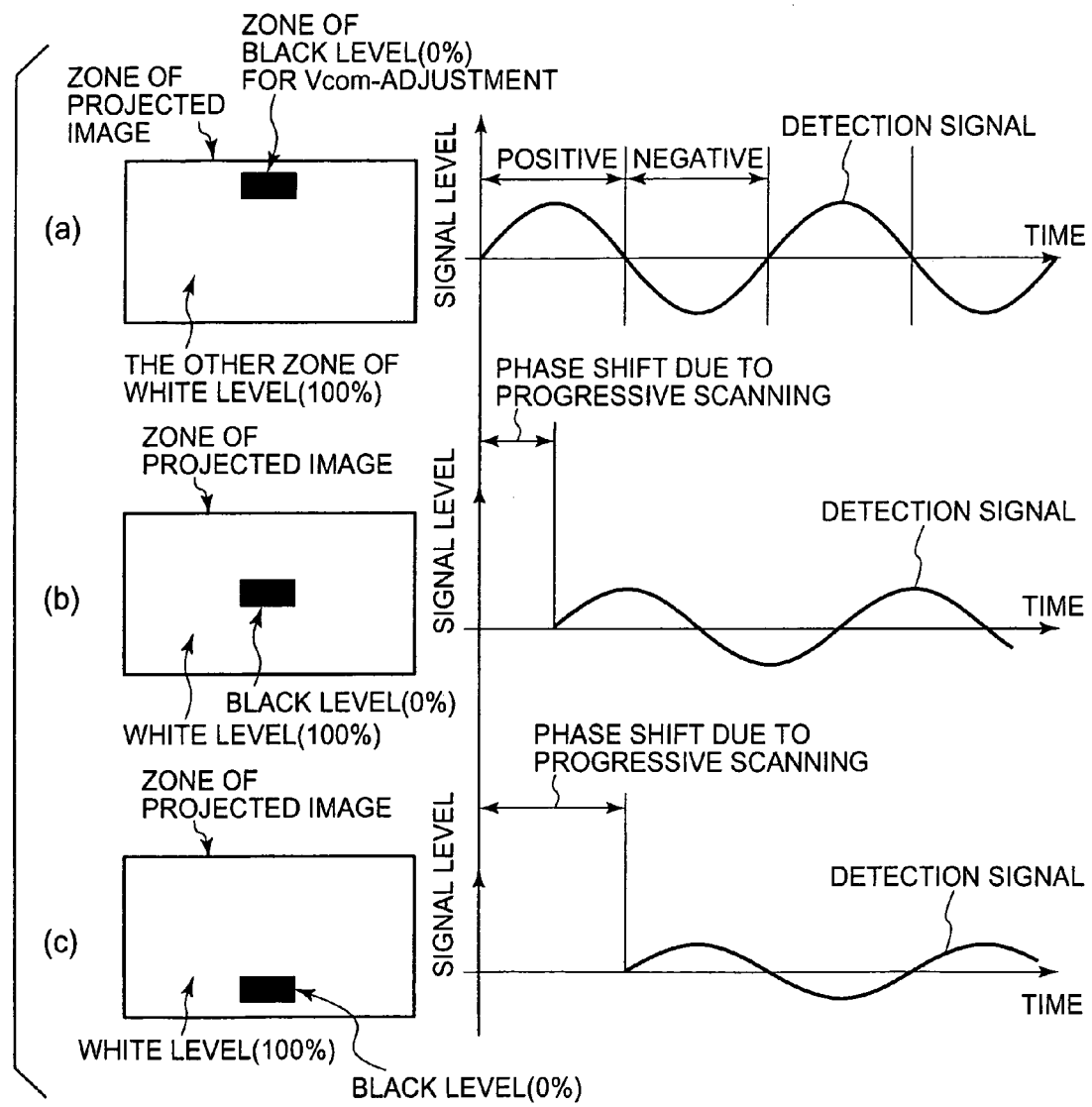
FIG. 10 shows an illustration that explains change in voltage of a detection signal of an optical sensor depending on a displaying zone.

Described next with respect to FIGS. 9 and 10 is a Vcom-adjustment for a specific zone of a projected image for the projection display apparatus 1 (FIG. 1) equipped with the Vcom-adjustment circuits for R-, G- and B-rays (FIG. 6).

The intensity of the bundle Hd of B-rays to be incident on the optical sensor 21b, as illustrated in FIG. 5, depends on the optical modulation performed at the reflective liquid crystal display device 12b for B-ray. The same is also true for R- and G-rays.

The optical modulation at the reflective liquid crystal display devices 12r, 12b and 12g is induced by change in polarization state of the bundle Hb (FIGS. 4 and 5) of P-polarized beams that occurs when bundles Hb of rays of the colors R, G and B are incident on the corresponding display devices while the liquid crystals of the display devices are being realigned in response to drive voltages based on input video signals.

The following discussion focuses on G-ray, however, it is also applied to R- and B-rays.

The reflective polarizer 13g and the transparent polarizer 15g installed in the projection display apparatus 1 (FIG. 1) are compared to each other for their optical characteristics (the transmittance of P- and S-polarized beam components) at the center wavelength of 550 nm of G-ray.

The reflective polarizer 13g is designed to exhibit a higher extinction ratio (Tpw/Tsw) that is obtained by dividing a transmittance (Tpw) for a P-polarized beam component by a transmittance (Tsw) for an S-polarized beam component, for higher contrast of light to pass therethrough. The transparent polarizer 15g is designed to exhibit a higher transmittance (Tsa) for an S-polarized beam component to achieve a higher total transmittance. Therefore, the polarizers 13g and 15g exhibit a lower Tsw and a higher Tsa, respectively.

Under such design on transmittance, the reflectivity of each of the reflective polarizer 13g and the transparent polarizer 15g is in inverse proportion to the respective transmittance of the polarizers. This is because the polarizers 13g and 15g suffer almost no optical loss (absorption). Therefore, the polarizers 13g and 15g exhibit a higher reflectivity Rsw to an S-polarized beam component and a lower reflectivity Rsa to an S-polarized beam component, respectively.

In the embodiment, the reflective polarizer 13g exhibits the reflectivity Rpw of 1% to a P-polarized beam component and the reflectivity Rsw of 91% to an S-polarized beam component, both at 550 nm in the center wavelength of G-ray.

Moreover, in the embodiment, the transparent polarizer 15g exhibits the reflectivity Rpa of 89% to a P-polarized beam component and the reflectivity Rsa of 0.05% to an S-polarized beam component, both at 550 nm in the center wavelength of G-ray.

When an input video signal of a black level (0%) is supplied to the reflective liquid crystal display device 12g, a bundle of rays reflected by the display device 12g is a bundle of P-polarized beams.

This bundle of P-polarized beams is then incident on the reflective polarizer 13g and by which 1% of the P-polarized beams is reflected although most of them are allowed to pass therethrough, because of the reflectivity Rpw of 1% of the polarizer 13g.

The one percent of the P-polarized beams reflected by the reflective polarizer 13g, that corresponds to the bundle Hc in FIG. 5, is then incident on the transparent polarizer 15g. The incident bundle Hc of P-polarized beams is reflected by the polarizer 15g for its 89% because of 89% in the reflectivity Rpa of the polarizer 15g.

A percent Ib of the intensity of a bundle of rays to be incident on the optical sensor 21g after reflected by the transparent polarizer 15g is given as shown below when a bundle of rays of 100% in intensity is incident on the reflective liquid crystal display device 12g while an input video signal of a black level (0%) is being supplied to the device 12g.

$$Ib = Rpw \times Rpa = 1\% \times 89\% = 0.89\%$$

This calculation is based on assumption that the reflective liquid crystal display device 12g would suffer no losses in optical modulation and reflection and reflect an incident bundle Hb (FIG. 5) of rays at 100%.

In contrast, when an input video signal of a white level (100%) is supplied to the reflective liquid crystal display device 12g, a bundle of rays reflected by the device 12g is a bundle of S-polarized beams.

This bundle of S-polarized beams is then incident on the reflective polarizer 13g and by which 91% of the S-polarized beams is reflected because of 91% in the reflectivity Rsw of the polarizer 13g.

The ninety-one percent of S-polarized beams reflected by the reflective polarizer 13g, that corresponds to the bundle Hc in FIG. 5, is then incident on the transparent polarizer 15g. The incident bundle Hc of S-polarized beams is reflected by the polarizer 15g for its 0.05% because of 0.05% in the reflectivity Rsa of the polarizer 15g, although most of them are allowed to pass therethrough.

A percent Iw of the intensity of a bundle of rays to be incident on the optical sensor 21g after reflected by the transparent polarizer 15g is given as shown below when a bundle of rays of 100% in intensity is incident on the reflective liquid crystal display device 12g while an input video signal of a white level (100%) is being supplied to the device 12g.

$$Iw = Rsw \times Rsa = 91\% \times 0.05\% = 0.0455\%$$

This calculation is based on assumption that the reflective liquid crystal display device 12g would suffer no losses in optical modulation and reflection and reflect an incident bundle Hb (FIG. 5) of rays at 100%.

The foregoing calculations teach that the percent Ib of 0.89% is about 20 times higher than the percent Iw of 0.0455%, in which Ib and Iw are the percent of intensity of rays to be incident on the reflective liquid crystal display device 12g while input video signals of a black level (0%) and a white level (100%), respectively, are being supplied to the device 12g, as discussed above.

According to the discussion, it is understood that, in Variation 2, as illustrated in FIG. 9, Vcom-adjustments are performed to an image of a black level (0%) that is displayed in a specific zone in an image of a white level (100%), which can restrict more flickers on projected images.

The specific zone to which an image of a black level (0%) is to be displayed for Vcom-adjustments can be determined as follows:

As illustrated in FIG. 10, change in Vcom voltage causes optical-sensor detection signals to vary almost like sine waves, which induce flickers on projected images.

In detail, the optical-sensor detection signals vary in phase, as shown in (a) to (c) of FIG. 10, depending on the location of an image in the vertical direction due to progressive scanning in the vertical direction in projection display apparatuses.

In Variation 2, the TG 27 (FIG. 7) can be adjusted to change the generation timing of the positive and negative trigger signals to determine the specific zone to which Vcom-adjustments are to be performed.

Illustrated in FIG. 10 is that flickers occur in a lower zone of an projected image, which cause change in Vcom voltage.

[Variation 3]

Figure 11:
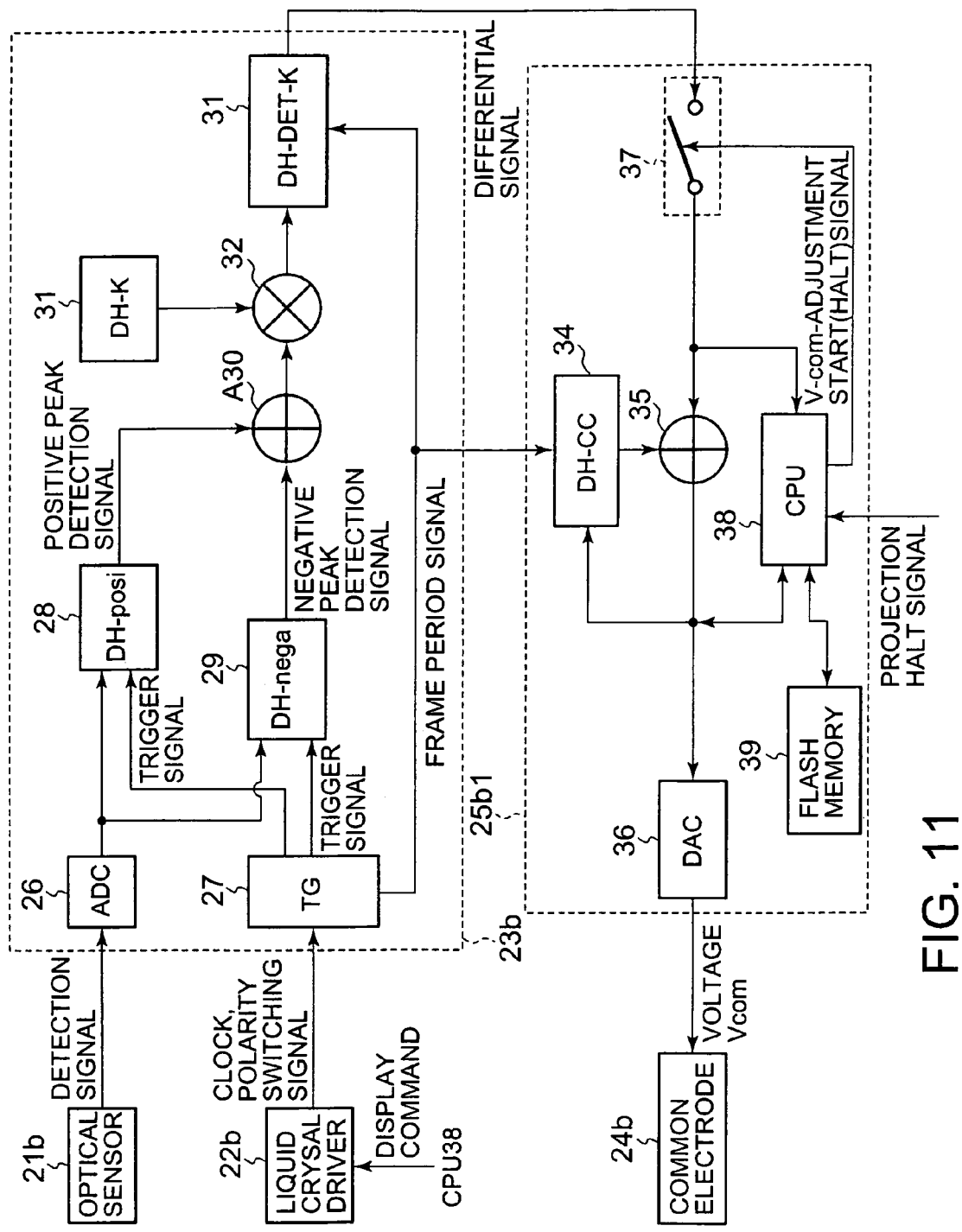
FIG. 11 shows a circuit diagram of a Vcom-adjustment circuit for B-ray (the same being applied to G- and R-rays) installed in the projection display apparatus, according to the present invention;.
Figure 12:
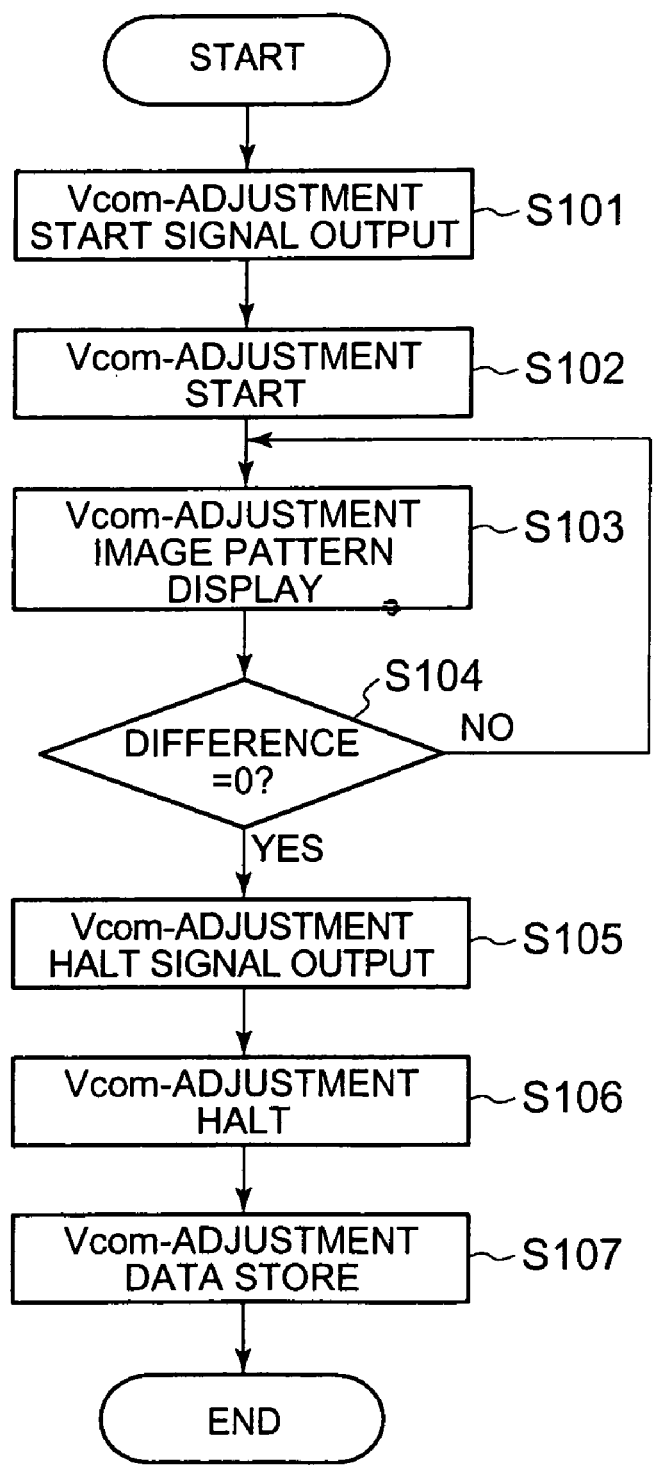
FIG. 12 shows a flowchart of an operation of a Vcom-adjustment circuit for B-ray (the same being applied to G- and R-rays) installed in the projection display apparatus, according to the present invention.

Described next with respect to FIGS. 11 and 12 is automatic Vcom-adjustments for the projection display apparatus 1 (FIG. 1) equipped with Vcom-adjustment circuits for R-, G- and B-rays basically similar to that shown in FIGS. 6 and 7.

Figure 7:
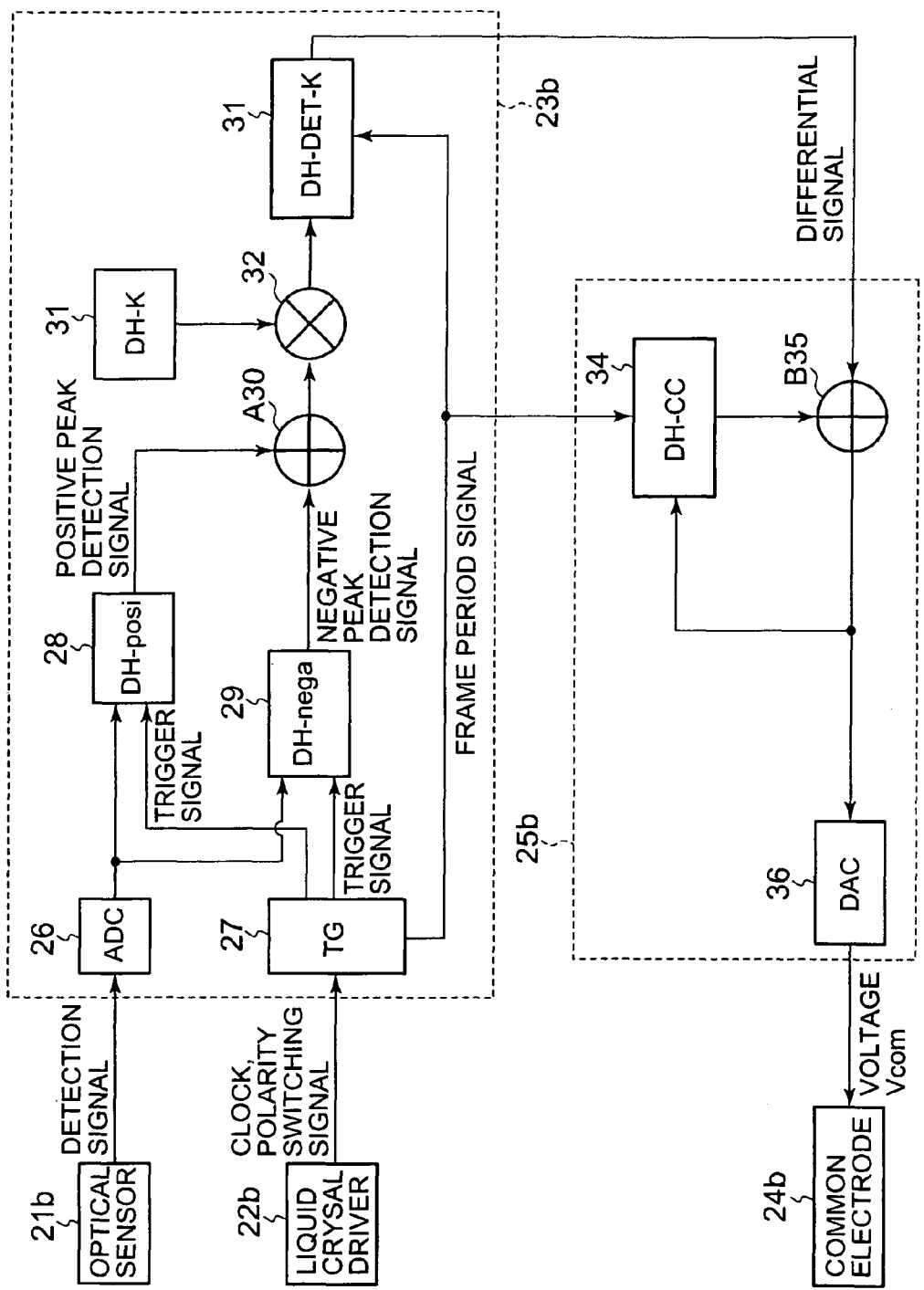
FIG. 7 shows a circuit diagram of a Vcom-adjustment circuit for B-ray (the same being applied to G- and R-rays) installed in the projection display apparatus, according to the present invention;.

The difference between a Vcom-adjustment circuit shown in FIG. 11 in Variation 3 and that in FIGS. 6 and 7 is that Variation 3 has an adjuster 25b1 for automatic Vcom-adjustments which will only be explained below.

In addition to the DH-CC 34, the subtractor B35, and the DAC 36, the same as those in FIG. 7, the adjuster 25b1 is equipped with: a Vcom-adjustment start switch 37 provided between the DH-DET-K 33 and the subtractor B35, by which an automatic Vcom-adjustment mode is turned on or off; a CPU 38 that outputs a control signal to the switch 37 to turn on or off the automatic Vcom-adjustment mode, in accordance with an external signal; and a flash memory 39 for storing Vcom-adjustment data.

Accurate Vcom-adjustments to obtain an appropriate voltage Vcom in image projection require projection of an image of a specific pattern. Such an image of a specific pattern may also be displayed when the projection display apparatus 1 starts or halts projection.

The voltage Vcom, however, could vary due to the temperature change of the optical system and the reflective liquid crystal display devices 12r, 12g and 12b of the projection display apparatus 1. Vcom-adjustments when the display apparatus 1 starts projection may not be accurate due to change in the voltage Vcom caused by light emitted from the light source 2 that increases the temperature of the optical system and the reflective liquid crystal display devices 12r, 12g and 12b.

Thus, accurate Vcom-adjustments can be achieved when the projection display apparatus 1 halts projection in which the optical system and the reflective liquid crystal display devices 12r, 12g and 12b have been kept at a stable temperature with illumination of the light from the light source 2.

Described below with reference to FIGS. 11 and 12 are automatic Vcom-adjustments that are performed when the projection display apparatus 1 halts projection, which can, however, be performed when the display apparatus 1 starts or during projection.

When the CPU 38 receives a (an external) projection halt signal, it outputs a Vcom-adjustment start signal to the Vcom-adjustment start switch 37 (S101). On receiving the start signal, the switch 37 is turned on to start Vcom-adjustments (S102).

When the Vcom-adjustment start switch 37 is turned on, the CPU 38 sends a display command signal to the liquid crystal driver 22b which then applies a drive signal to the reflective liquid crystal display device 12b for B-ray to display a Vcom-adjustment image pattern (S103).

Figure 8:
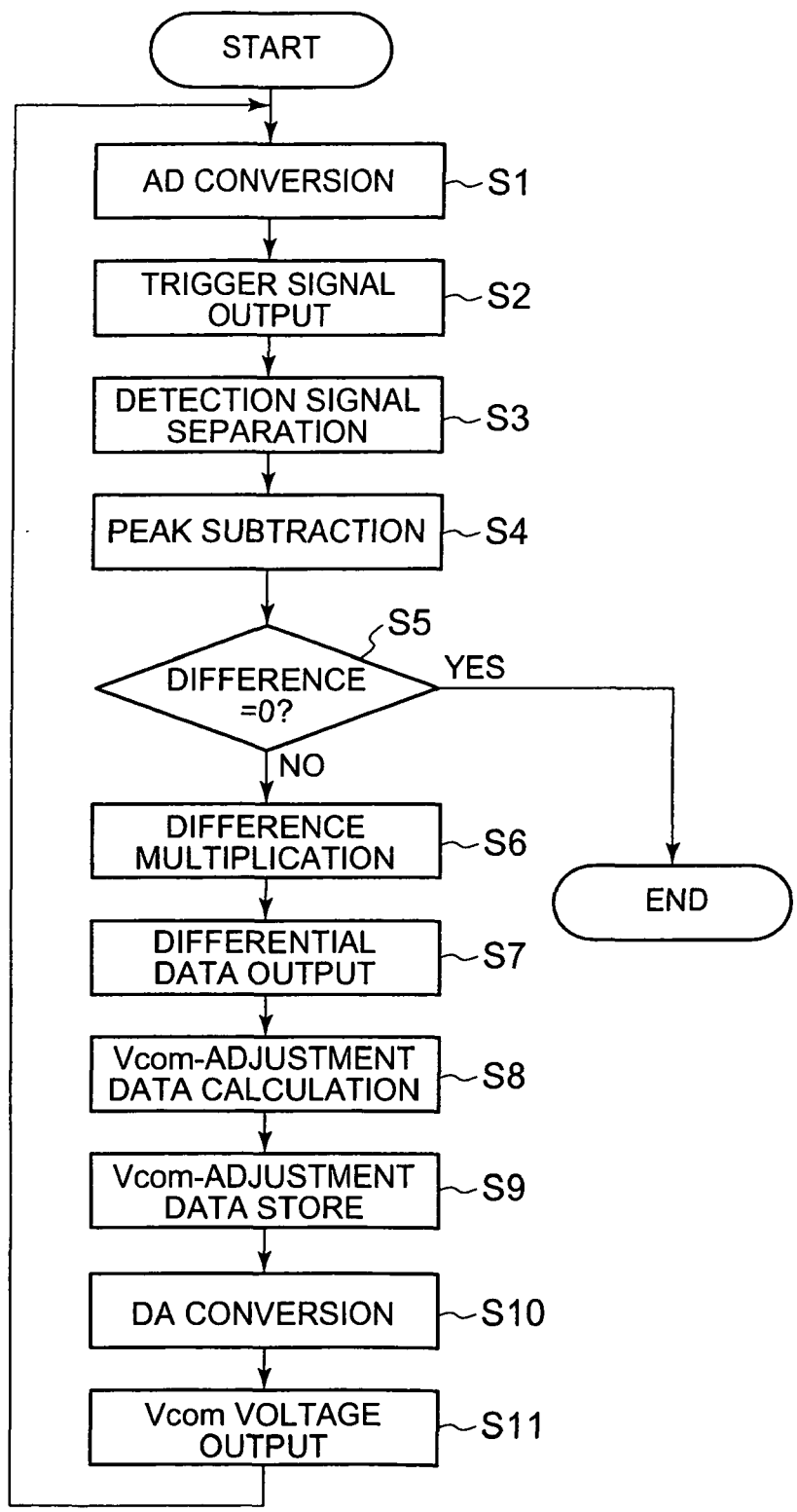
FIG. 8 shows a flowchart of an operation of a Vcom-adjustment circuit for B-ray (the same being applied to G- and R-rays) installed in the projection display apparatus, according to the present invention.

When the Vcom-adjustment image pattern is displayed, the detector 23b (FIG. 6) performs the Vcom-adjustment procedure corresponding to the steps S1 to S5 in FIG. 8 (Variation 1) to the image pattern to obtain the differential data while the Vcom-adjustment start switch 37 is on until the differential data becomes zero for every frame (S104).

When the differential data of zero is obtained, the CPU 38 outputs a Vcom-adjustment halt signal to the Vcom-adjustment start switch 37 (S105). On receiving the halt signal, the switch 37 is turned off to halt Vcom-adjustments (S106).

The result of subtraction at the subtractor B35 when the differential data of zero is obtained is then stored in the flash memory 39 as the Vcom-adjustment data (S107).

The projection display apparatus 1 then halts projection when it is confirmed that the differential data of zero is stored in the flash memory 39.

As described, in Variation 3, Vcom-adjustments start when the projection halt signal is received, or start after the optical system and the reflective liquid crystal display devices 12r, 12g and 12b have been kept at a stable temperature with illumination of the light from the light source 2. Thus, Variation 3 achieves higher accurate Vcom-adjustments.

The Vcom-adjustment data stored in the flash memory 39 can be retrieved when the projection display apparatus 1 starts projection of actual images (not the Vcom-adjustment image pattern) so that image of almost no flickers can be displayed from the projection start-up.

The Vcom-adjustments in Variation 3 may be performed at the projection start-up with a (an external) projection start signal supplied to the CPU 38 to turn on the Vcom-adjustment start switch 37.

[Variation 4]

It is known that the voltage Vcom shows a bigger change in image projection when an interval between turned-on and turned-off is longer in a projection display apparatus. In detail, the interval is the period between the halt of previous m-th projection ("m" being an integer of 1 or more) at turn-off of the display apparatus and the start of next (m+1)-th projection at turn-on of the display apparatus being turned on.

Figure 13:
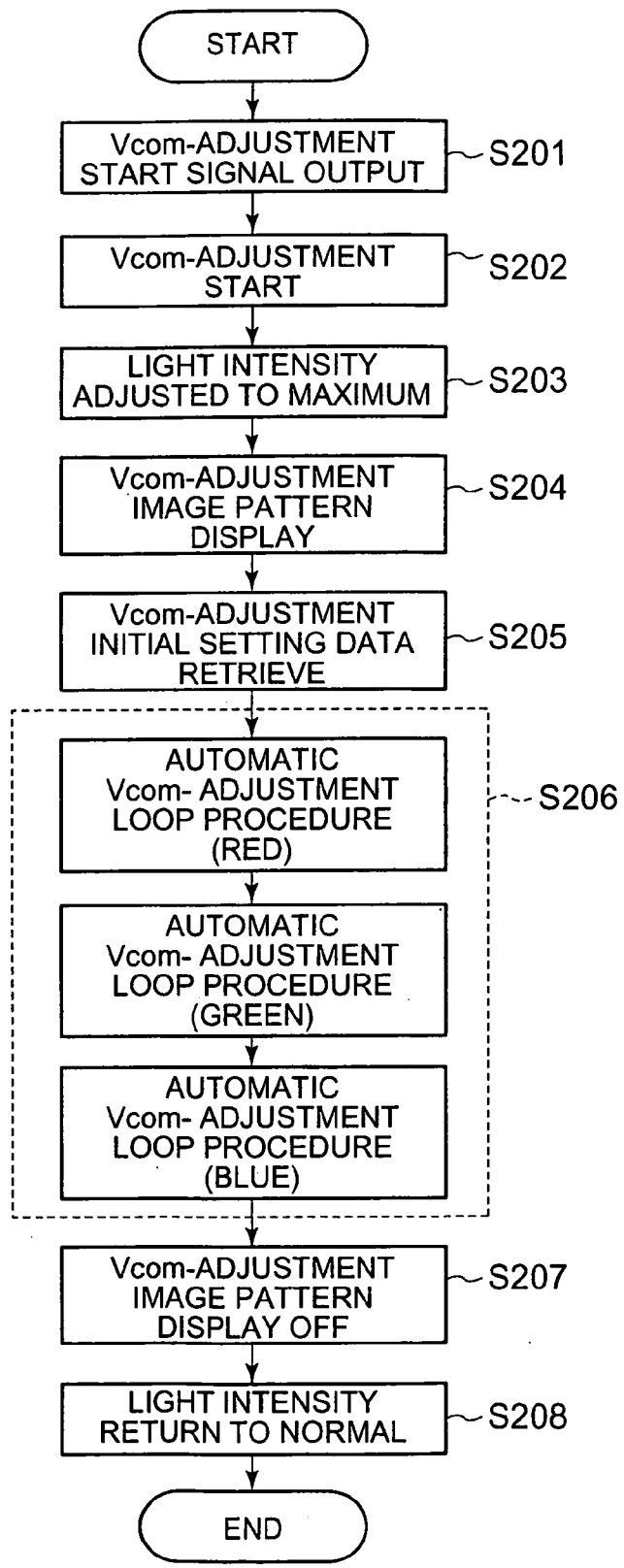
FIG. 13 shows a flowchart of an operation of a Vcom-adjustment circuit for B-ray (the same being applied to G- and R-rays) installed in the projection display apparatus, according to the present invention.

To avoid such a problem, Variation 4 for the projection display apparatus 1 (FIG. 1) offers automatic Vcom-adjustments that are performed when the projection display apparatus 1 is turned on (to start projection) and also turned off (to halt projection), which will be described with reference to FIGS. 13 to 15.

Variation 4 for the projection display apparatus 1 also employs the Vcom-adjustment circuit shown in FIG. 11.

When the projection display apparatus 1 is turned on to start projection, the optical system and the reflective liquid crystal display devices 12r, 12g and 12b are heated to raise their temperatures due to the illumination of the light from the light source 2. The temperatures rapidly rise just after the display apparatus 1 is turned on and then become stable after the elapse of about 30 minutes.

Therefore, the temperature change just after the projection start is a key factor for Vcom-adjustments at the projection start, which requires that, after a Vcom-adjusting voltage Vs is obtained, a variant α of the Vcom-adjusting voltage due to temperature change after Vcom-adjustments is added to the voltage Vs.

The variant α of the Vcom-adjusting voltage due to temperature change after Vcom-adjustments is given as follows:

$$\alpha = Ved - Vst$$

in which Vst and Ved denote Vcom-adjusting voltages at projection start and halt, respectively.

The variant α of the Vcom-adjusting voltage Vs is stored in the flash memory 39 (FIG. 11). The stored variant α is then added to the Vcom-adjusting voltage Vst obtained at the next time the display apparatus 1 is turned on to start projection, for accurate Vcom-adjustments against the temperature change of the optical system and the reflective liquid crystal display devices 12r, 12g and 12b.

A Vcom-adjusting voltage Vst at projection start and a Vcom-adjusting voltage Ved at projection halt are obtained as follows and as shown FIG. 13.

When the CPU 38 receives a (an external) projection start (halt) signal, it outputs a Vcom-adjustment start signal to the Vcom-adjustment start switch 37 (S201). On receiving the start signal, the switch 37 is turned on to start Vcom-adjustments (S202).

When the Vcom-adjustment start switch 37 is turned on, the intensity of the light source 2 is adjusted to be a maximum level for accurate Vcom-adjustments at the minimum flickers (S203).

Then, the CPU 38 sends a display command signal to the liquid crystal driver 22b to display a Vcom-adjustment image pattern (S204). The Vcom-adjustment image pattern is preferably a raster pattern with the brightness of about 50%.

Next, the CPU 38 retrieves initial setting data for Vcom-adjustments from the flash memory 39 (S205). The initial setting data may include a current Vcom-adjusting level ($Vz_0$), the number (i) of loops of an automatic Vcom-adjustment loop procedure, the number (j) of loops of an automatic flicker measurement loop procedure, a variant (Vy) of the voltage Vcom in automatic flicker measurements, a voltage level (Vx) to be added and an adjustment coefficient (k) after detection of whether the voltage Vcom is shifted to a positive or negative side in polarity.

When the CPU 38 has retrieved the initial setting data, it starts the automatic Vcom-adjustment loop procedure which will be described later, for each of R-, G-, and B-rays (S206). The procedure may be performed with sequential emission of R-, G-, and B-rays for Vcom-adjusting level setting for respective colors or simultaneous emission of R-, G-, and B-rays for Vcom-adjusting level settings for all colors.

When the Vcom-adjusting level settings are complete for all colors, it is finished to display the Vcom-adjustment image pattern (S207) and then the intensity of the light source 2 is returned to be a normal level (S208).

Figure 14:
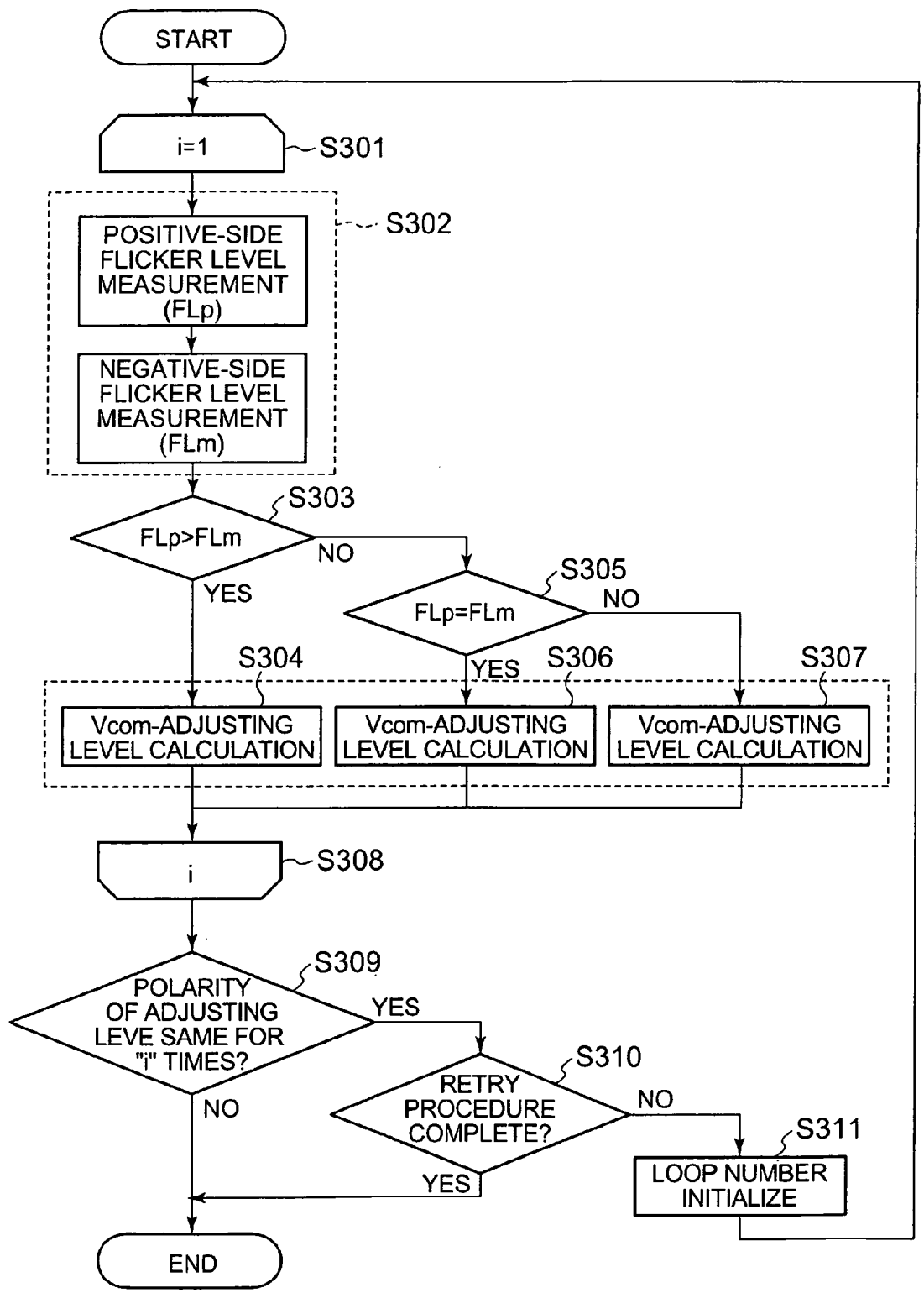
FIG. 14 shows a flowchart of an automatic Vcom-adjustment loop procedure in the projection display apparatus, according to the present invention.

The automatic Vcom-adjustment loop procedure (S205) is described with respect to FIG. 14.

The CPU 38 performs the automatic Vcom-adjustment loop procedure with initial setting data retrieved from the flash memory 39 (S205) for "i" times of loops (S301). In the following description, the procedure is explained that it is performed five times (i=0 to 5). Plural times of loop procedure offer a wider voltage range in Vcom-adjustments to have a wider margin of measurements.

Flicker levels at a positive side (FlP) and a negative side (Flm) in polarity are measured first (S302).

In detail, voltages Vcom (Vip) and (Vim) at a positive and a negative side, respectively, to which the voltage Vcom is shifted in polarity are obtained as shown below by using the current Vcom-adjusting setting level ($Vz_0$) and a variant (Vy) of the voltage Vcom in automatic flicker measurements retrieved from the flash memory 39.

$$Vip = Vz_0 + Vy$$

$$Vim = Vz_0 - Vy$$

Measured in step S302 are: a flicker level (FlP) at the positive side in polarity with an automatic flicker measurement loop procedure (which will be described later) by applying the voltage Vcom (Vip) at the positive side to the common electrode of each of the reflective liquid crystal display devices 12r, 12g and 12b for R-, G- and B-rays, respectively; and then a flicker level (Flm) at the negative side in polarity with the automatic flicker measurement loop procedure (which will be described later) by applying the voltage Vcom (Vim) at the negative side to the common electrode of each reflective liquid crystal display device.

Comparison is made between the flicker levels (FlP) and (FlM) at the positive and negative sides in polarity, respectively (S303).

When the flicker level (FlP) at the positive side is higher than the flicker level (FlM) at the negative side (YES in step S303), the first-time Vcom-adjusting level ($Vz_1$) is obtained as shown below in order to shift the voltage Vcom to the negative side in polarity (S304).

$$Vz_1 = Vz_0 - Vx \times k \ (k=2 \text{ for } i=1 \text{ to } 3, k=1 \text{ for } i=4 \text{ to } 5)$$

In this equation, Vx denotes a voltage level to be added after determination of whether the voltage Vcom to be shifted to the positive or negative side in polarity and k denotes a coefficient, Vx and k being data retrieved from the flash memory 39 in step S205.

When the flicker level (FlP) at the positive side is not higher than the flicker level (FlM) at the negative side (NO in step S303), it is determined whether the flicker levels (FlP) and (FlM) are equal to each other (S305).

When the flicker levels (FlP) and (FlM) at the positive and negative sides, respectively, are equal to each other (YES in step S305), the first-time Vcom-adjusting level ($Vz_1$) is obtained as shown below (S306).

$$Vz_1 = Vz_0$$

On the contrary, when the flickers (FlP) and (FlM) at the positive and negative sides, respectively, are not equal to each other (NO in step S305), the first-time Vcom-adjusting level ($Vz_1$) is obtained as shown below in order to shift the voltage Vcom to the positive side in polarity (S307).

$$Vz_1 = Vz_0 + Vx \times k \ (k=2 \text{ for } i=1 \text{ to } 3, k=1 \text{ for } i=4 \text{ to } 5)$$

The automatic Vcom-adjustment loop procedure from steps S301 to S307 is repeated five (i=5) times (5308).

In the second-time measurements, the second-time Vcom-adjusting level ($Vz_2$) is obtained by using the first-time Vcom-adjusting level ($Vz_1$), not the current Vcom-adjusting level ($Vz_0$). Likewise, the third-, the fourth-, and the fifth-time adjusting levels ($Vz_3$, $Vz_4$, and $Vz_5$) are sequentially obtained by using the previous-time Vcom-adjusting levels ($Vz_2$, $Vz_3$, and $Vz_4$), respectively, in the third-, the fourth-, and fifth-time measurements, respectively.

At the end of the fifth-time automatic Vcom-adjustment loop procedure, comparison is made on polarity among the five Vcom-adjusting levels ($Vz_1$, $Vz_2$, $Vz_3$, $Vz_4$, and $Vz_5$) (5309).

It is determined that flickers are at the minimum level when the polarity is different (NO in step S309) among the five Vcom-adjusting levels ($Vz_1$, $Vz_2$, $Vz_3$, $Vz_4$, and $Vz_5$). The fifth-time Vcom-adjusting level $Vz_5$ is then set as a start-up Vcom-adjusting level (Vst) for. Vcom-adjustments at the start-up of the projection display apparatus 1, and the procedure ends.

On the contrary, when the polarity is the same (YES in step S309) for all of the five Vcom-adjusting levels ($Vz_1, Vz_2, Vz_3, Vz_4$, and $Vz_5$), it is determined that flickers are not at the minimum level, followed by the automatic Vcom-adjustment loop procedure being performed again (which is referred to as a retry procedure, hereinafter) to set the fifth-time Vcom-adjusting level ($Vz_5$) as a start-up Vcom-adjusting level (Vst) to the projection display apparatus 1 (FIG. 1) for use in Vcom-adjustments at the start-up of the apparatus 1 (S310).

When the retry procedure is not performed (NO in step S310), the number of loops (i) is initialized to be 0 (S311), followed by the automatic Vcom-adjustment loop procedure from steps S301 to S307. When the retry procedure has been performed (YES in step S310), the procedure ends.

In the same way as described above, a halt Vcom-adjusting level (Ved) is obtained for use in Vcom-adjustments at the halt of the projection display apparatus 1.

Figure 15:
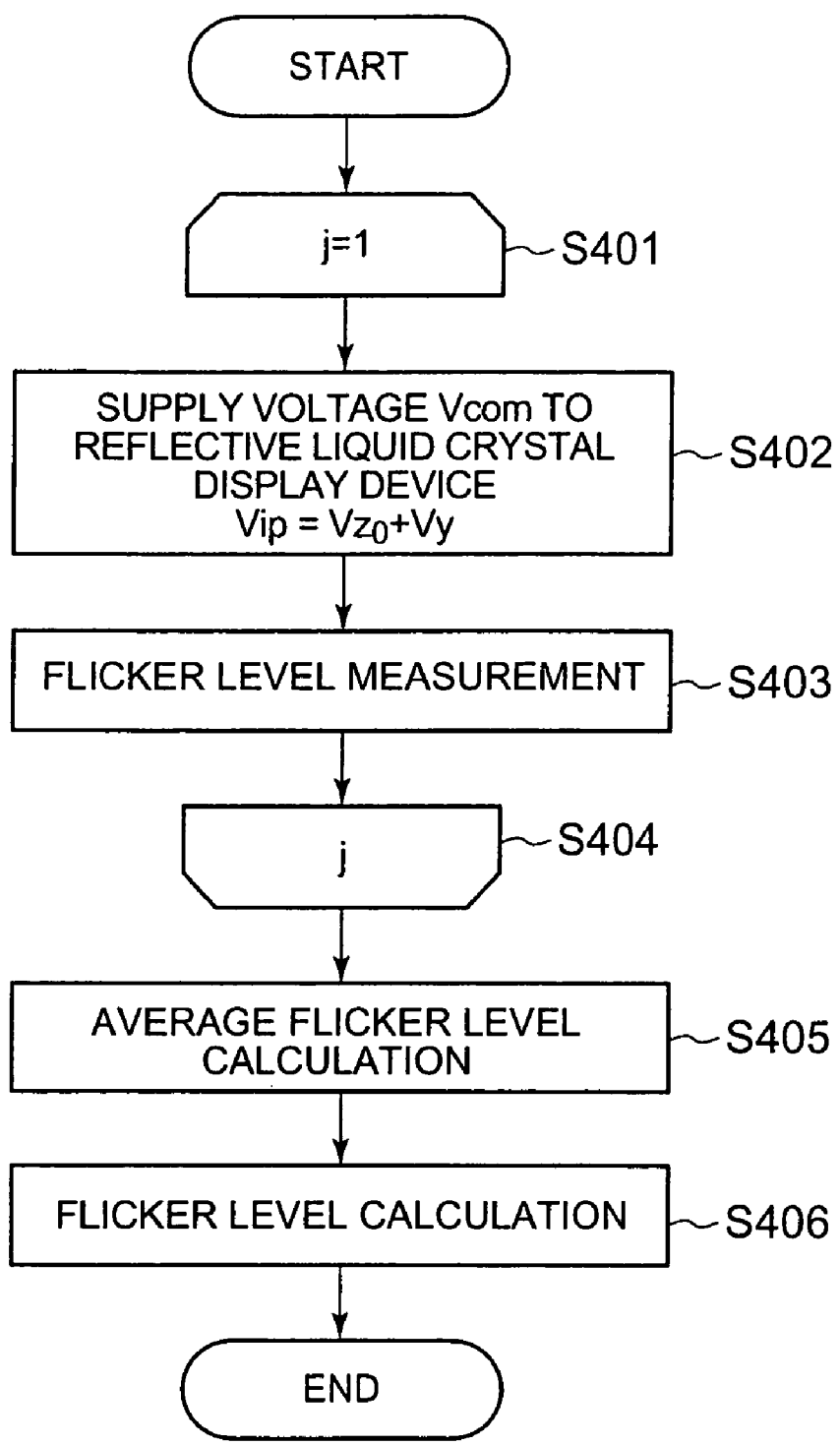
FIG. 15 shows a flowchart of a flicker-level measurement loop procedure in the projection display apparatus, according to the present invention.

Described next with reference to FIG. 15 is the automatic flicker-level measurement loop procedure (S302) for the flicker level (FlP) at the positive side in polarity, the same being applied to the flicker level (Flm) at the negative side in polarity.

The automatic flicker measurement loop procedure is performed "j" times (S401), the number data "j" being retrieved from the flash memory 39 in step S205. The following description is made for ten times of the loop procedure.

Firstly, a voltage Vcom (Vip) at the positive side to which the voltage Vcom is shifted is obtained as follows:

$$Vip = Vz_0 + Vy$$

in which $Vz_0$ and Vy denote the current Vcom-adjusting level and a variant of the voltage Vcom in automatic flicker measurements, respectively, retrieved from the flash memory 39, the voltage Vcom (Vip) being supplied to the associated reflective liquid crystal display devices 12r, 12g and 12b (S402). The procedure from step S401 to S406 is performed for each of the display devices 12r, 12g and 12b.

First-time measurement is made for a flicker level ($Flp_1$) at the positive side when the time corresponding to one frame or more (e.g. 50 msec) elapses after the application of the voltage Vcom (Vip) at the positive side in polarity (S403).

Second- to tenth-time measurements are made for flicker levels ($Flp_2$ to $Flp_{10}$) at the positive side in polarity in the same way as above (S404).

Obtained next is an average level ($Flp_{ave}$) of the flicker levels ($Flp_1$ to $Flp_{10}$) at the positive side in polarity in the first- to tenth-time measurements (S405).

The absolute value of the average level ($Flp_{ave}$) of the flicker levels ($Flp_1$ to $Flp_{10}$) at the positive side in polarity is then obtained as a flicker level (Flp) at the positive side (S406).

Obtained through the procedures are Vcom-adjusting voltages (Vst) and (Ved) at projection start and halt, respectively, for the projection display apparatus 1. Then, the variant α of the Vcom-adjusting level due to temperature change is obtained as α=Ved−Vst and stored in the flash memory 39. In relation to S309 in FIG. 14, the variant α to be stored in the flash memory 39 is at the minimum level because it is obtained when flickers are at the minimum level.

The variant α of the Vcom-adjusting level is stored in the flash memory 38 several times, for example, 8 times. In detail, for decreasing errors in calculation of the variant α, the following procedures are performed.

Whenever the projection display apparatus 1 is turned on and off to start and halt projection, respectively, α=Ved−Vst is obtained as follows:

Variants $α1=Ved1−Vst1, α2=Ved2−Vst2, \ldots, α8=Ved8−Vst8, α9=Ved8−Vst9, \ldots$, are obtained at projection start and halt of the first time, the second time, . . . , the eighth time, the ninth time, . . . , whenever the projection display apparatus 1 is turned on and off.

The eight variants $α1, \ldots, α8$ are stored in the flash memory 38. And, an average variant αA is obtained from the eight variants $α1, \ldots, α8$. The average variant αA is then added to the Vcom-adjusting voltage Vst obtained at the ninth-time start of the projection display apparatus 1 for Vcom-adjustments to obtain an appropriate voltage Vocm.

When the ninth-time variant α9 is obtained, the first-time variant α1 (the oldest data in the flash memory 38) is updated to the variant α9, which is proceeded whenever the projection display apparatus 1 is turned on and off to start and halt projection, respectively, to obtain the latest variant α.

As described above, the voltage Vcom to be used in projection of actual images (which is referred to as actual-image projection, hereinafter, for images not a raster pattern image for Vcom-adjustments) is obtained by adding an average value of variants a stored in the flash memory 38 several times to the Vcom-adjusting voltage Vst obtained at the start of the projection display apparatus 1, which achieves projection with adjustments to the voltage Vcom that is shifted due to temperature change.

When a user turns on the projection display apparatus 1 for the first time after purchase, the voltage Vcom to be applied is obtained by adding an average variant α0 of the Vcom-adjusting level to an initial start-up Vcom-adjusting voltage Vst, the average variant α0 being prestored in the flash memory 39 when shipped from a factory.

Moreover, comparison is made between a voltage Vcom measured at the start-up of the projection display apparatus 1 and another a voltage Vcom measured at the previous halt of the apparatus 1 and stored in the flash memory 39. When the difference between the voltages Vcom is small enough so that it can be determined that there is almost no change in the voltages Vcom, the voltage level (Vx) and the adjustment coefficient (k) both stored in the flash memory 39 are not added to the voltage Vcom to be applied.

In detail, when the difference between the voltages Vcom measured at the start-up and halt of the projection display apparatus 1 is equal to or smaller than (Vx×k), the voltage level (Vx) and the adjustment coefficient (k) are not added to the voltage Vcom to be applied which could otherwise cause the shift of the voltage Vcom from an appropriate level.

More in detail, when the difference between the voltages Vcom measured at the start-up and halt of the projection display apparatus 1 is equal to or smaller than (Vx×k)/2, the voltage level (Vx) and the adjustment coefficient (k) are not added to the voltage Vcom to be applied, the voltage Vcom measured at the start-up is used as a voltage Vcom in actual-image projection.

Furthermore, when the projection display apparatus 1 is turned on, the temperatures of the optical system and the reflective liquid crystal display devices 12r, 12g and 12b are raised by heat of the light source 2. The temperatures become almost stable when time elapses about 30 minutes after the start-up of the display apparatus 1, nevertheless, gradually vary to cause change in optimum voltage Vcom even if it is a slight change.

For example, when the projection display apparatus 1 is turned off within one hour of operation, the variant a between the Vcom-adjusting voltages at start and halt of the apparatus 1 due to temperature change is smaller and shows a big difference when compared to the variant a due to temperature change for the apparatus 1 that operates for longer hours.

Therefore, Vcom-measurements at halt of the projection display apparatus 1 is not performed when the apparatus 1 is turned off within one hour of operation.

[Variation 5]

Described next is Vcom-adjustments with removal of flickers that occur due to intensity change of the light source 2 caused by thermal convection of xenon gas filled in the xenon lamp 2a. Such a flicker is referred to as a lamp flicker, hereinafter.

The detection signals output from the optical sensors 21r, 21g and 21b involve a lamp flicker in addition to flickers due to the shift of the voltage Vcom. Such a lamp flicker is also required to be removed for accurate Vcom-adjustments.

Vcom-adjustments with removal of a lamp flicker will be described for the projection display apparatus 1 (FIG. 1) with reference to FIG. 16 that shows a variation to the Vcom-adjustment circuit shown in FIG. 7.

As shown in FIG. 15, different from the adjuster 25b (FIG. 7), an adjuster 25b2 is equipped with a low-pass filter (LPF) 40 between the DH-DET-K 33 of the detector 23b and the subtractor B35.

A lamp flicker occurs in a specific range of frequency. It was measured that the light source 2 having the xenon lamp 2a (FIG. 1) generated a lamp flicker at 40 Hz in frequency. Therefore, a lamp flicker involved in each of the detection signals of the optical sensors 21r, 21g and 21b can be removed with the LPF 40 to remove 40-Hz frequency-range components from each detection signal.

The LPF 40 may be provided at any location between each of the optical sensors 21r, 21g and 21b and the subtractor B35, but preferably between the DH-DET-K 33 that outputs a differential signal and the subtractor B35.

Provision of the LPF 40 offers an accurate voltage Vcom with no shift and with almost no adverse effects of lamp flickers for projection of images.

The frequency characteristics of the LPF 40 is required to be selected in accordance with the type of the lamp used for the light source 2 due to the fact that the frequency range in which a lamp flicker occurs depends on the lamp type, as discussed above.

The other variations described above can also be equipped with LPF 40.

As described in detail, the present invention in which the optical sensors 21r, 21g and 21b are provided at the specific locations in the projection display apparatus 1, described with reference to FIGS. 4 and 5, achieves higher mobility of the apparatus 1 and easier replacement of the projection lens 18 at a lower cost with no consideration of the optical sensors 21r, 21g and 21b, with no disadvantages such that the shade of each optical sensor is projected onto the screen.

Moreover, the present invention with such specific provision of the optical sensors 21r, 21g and 21b within the projection display apparatus 1 achieves a smaller number of optical sensors and a shorter measurement time.

Furthermore, the present invention with the optical sensors 21r, 21g and 21b independently provided for the colors R, G and B, respectively, within the projection display apparatus 1 achieves highly-accurate simultaneous Vcom-adjustments for the colors R, G and B with illumination of white light, with restricted flickers.

Moreover, as described with respect to FIGS. 9 and 10 for Vcom-adjustments for a specific zone of a projected image, the present invention achieves restriction of flickers that irregularly occur over a projected image, Furthermore, as described with respect to FIG. 15, the present invention achieves restriction of flickers originated from the liquid crystal display devices separated from lamp flickers.

Figure 16:
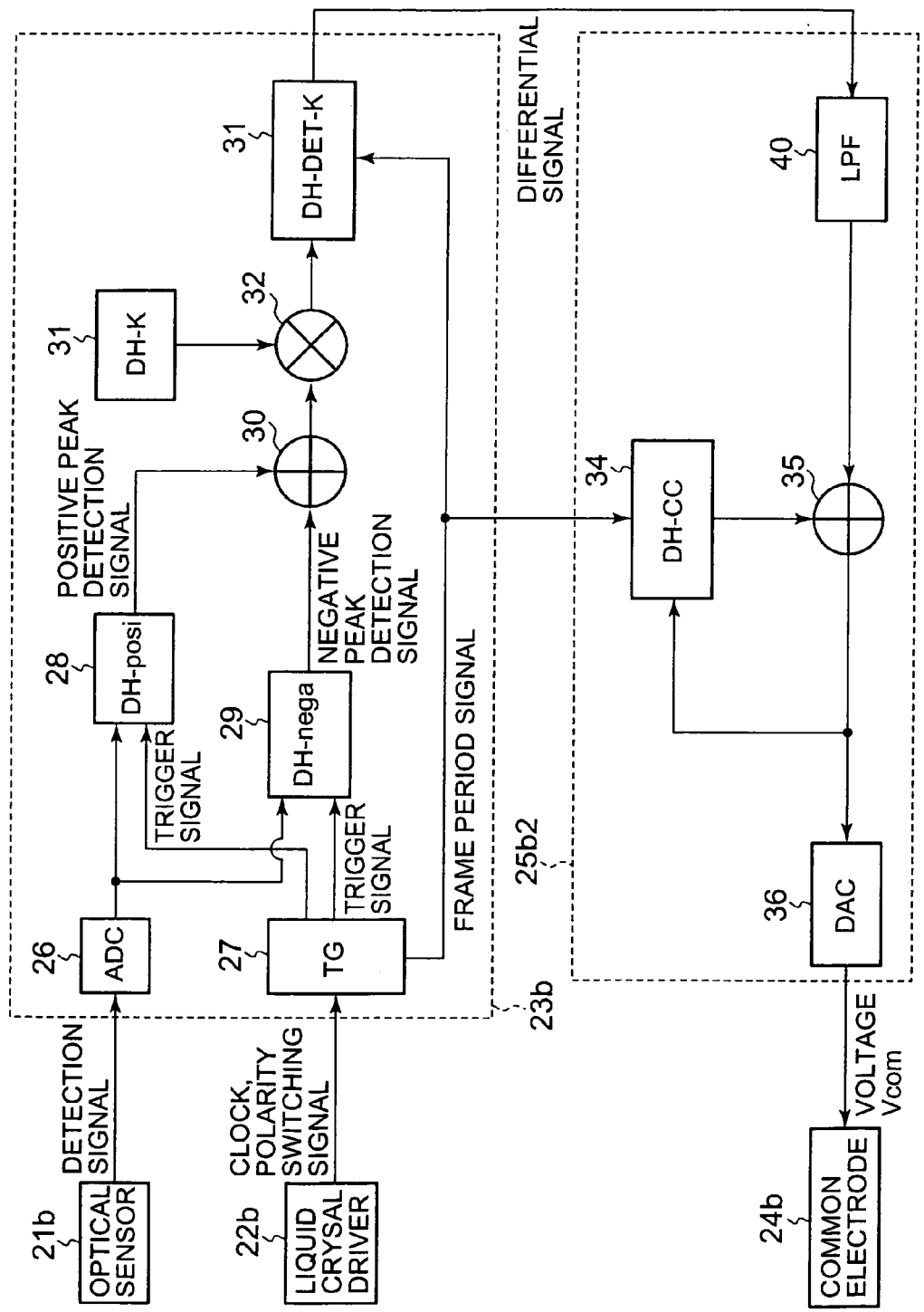
FIG. 16 shows a circuit diagram of a Vcom-adjustment circuit for B-ray (the same being applied to G- and R-rays) installed in the projection display apparatus, according to the present invention.

The Vcom-adjustment circuit of the present invention can be achieved with any circuit configuration, in addition to those shown in FIGS. 7, 11 and 16, as long as it can adjust voltages Vcom based on the difference between positive and negative detections signals detected by the optical sensors.

The projection display apparatus 1 is equipped with the optical modulators OMr, OMg and OMb for the three colors R, G and B, respectively, as described above. Nevertheless, flickers can be restricted by using at least one optical modulator provided for any one of the three colors R, G and B. In such a case, it is most effective to provide the optical modulator OMb to B-ray, as described above and shown in FIGS. 2, 4 and 5. This is because, the B-ray exhibits the highest intensity, mostly tends to cause flickers, and mostly affects organic materials due to its short wavelength, among the three colors.

Moreover, in the present invention, several optical sensors can be installed in other places, such as an outer edge of a screen or inside the optical system, like the known apparatus, in addition to those installed outside the optical system but within the projection apparatus, as described above and shown in FIGS. 2, 4, 5 and 6, for accurate Vocm-adjustments.

What is claimed is:

1. An optical modulator comprising:
a liquid crystal display device to convert a first linearly polarized-state bundle of rays, with optical modulation based on an input video signal, into a second linearly polarized-state bundle of rays that is orthogonal to the first linearly polarized-state bundle of rays in polarization, the first linearly polarized-state bundle of rays being involved in incident bundle of rays obtained by polarization conversion of a bundle of rays emitted from a light source and being incident on the optical modulator;
a reflective polarizer to allow the first linearly polarized-state bundle of rays to pass therethrough before the first linearly polarized-state bundle of rays is optically modulated into the second linearly polarized-state bundle of rays, to reflect a third linearly polarized-state bundle of rays in a first direction, the third linearly polarized-state bundle of rays being in parallel with the second linearly polarized-state bundle of rays in polarization and being originally involved in the incident bundle of rays, and to reflect the second linearly polarized-state bundle of rays in a second direction different from the first direction;
a transparent polarizer to allow the second linearly polarized-state bundle of rays reflected by the reflective polarizer in the second direction to pass therethrough and to reflect a fourth linearly polarized-state bundle of rays in the first direction, the fourth linearly polarized-state bundle of rays being in parallel with the first linearly polarized-state bundle of rays in polarization and being involved in the second linearly polarized-state bundle of rays reflected in the second direction; and
an optical sensor to detect the fourth linearly polarized-state bundle of rays reflected by the transparent polarizer,
wherein the liquid crystal display device is provided in a specific location so as to optically modulate the first linearly polarized-state bundle of rays that is incident thereon after passing through the reflective polarizer and to reflect the second linearly polarized-state bundle of rays obtained by the optical modulation towards the reflective polarizer so that the second linearly polarized-state bundle of rays is reflected by the reflective polarizer in the second direction, the reflective polarizer is provided in a specific location so as to allow the first linearly polarized-state bundle of rays to pass therethrough before optically modulated and to reflect the second linearly polarized-state bundle of rays obtained by the optical modulation towards the transparent polarizer, and the optical sensor is located on an optical path of the fourth linearly polarized-state bundle of rays reflected by the transparent polarizer in the first direction but not on an optical path of the third linearly polarized-state bundle of rays reflected by the reflective polarizer in the first direction.

2. The optical modulator according to claim 1, wherein the liquid crystal display device, the reflective polarizer, and the transparent polarizer are provided on three side faces of a triangular prism, with the optical sensor provided outside the triangular prism.

3. The optical modulator according to claim 1, wherein the incident bundle of rays is a red, a green, or a blue light.

4. A projection display apparatus comprising:

a color separator to separate a white light emitted from a light source into bundles of red, green, and blue rays;

a polarization converter to convert the bundles of red, green and blue rays into a first linearly polarized-state bundle of red rays, a first linearly polarized-state bundle of green rays, and a first linearly polarized-state bundle of blue rays, by beam splitting and polarization conversion;

optical modulators to optically modulate the first linearly polarized-state bundles of red, green, and blue rays into second linearly polarized-state bundles of red, green, and blue rays, respectively, based on an input video signal carrying images;

a color combiner to combine the second linearly polarized-state bundles of red, green, and blue rays into a combined second linearly polarized-state bundle of rays; and a projection lens via which the combined second linearly polarized-state bundle of rays is enlarged and projected onto a screen for displaying the images, wherein each optical modulator includes:

a liquid crystal display device to convert each of the first linearly polarized-state bundles of red, green, and blue rays, with optical modulation based on the input video signal, into a second linearly polarized-state bundle of rays that is orthogonal to each of the first linearly polarized-state bundles of red, green, and blue rays in polarization;

a reflective polarizer to allow each of the first linearly polarized-state bundles of red, green, and blue rays to pass therethrough before each of the first linearly polarized-state bundles of red, green, and blue rays is optically modulated into the second linearly polarized-state bundle of rays, to reflect a third linearly polarized-state bundle of rays in a first direction, the third linearly polarized-state bundle of rays being in parallel with the second linearly polarized-state bundle of rays in polarization and being involved in each of the first linearly polarized-state bundles of red, green, and blue rays and to reflect the second linearly polarized-state bundle of rays in a second direction different from the first direction;

a transparent polarizer to allow the second linearly polarized-state bundle of rays reflected by the reflective polarizer in the second direction to pass therethrough and to reflect a fourth linearly polarized-state bundle of rays in the first direction, the fourth linearly polarized-state bundle of rays (Hd) being in parallel with the first linearly polarized-state bundle of rays in polarization and being involved in the second linearly polarized-state bundle of rays reflected in the second direction, the second linearly polarized-state bundle of rays allowed to pass through the transparent polarizer being supplied to the color combiner; and an optical sensor to detect the fourth linearly polarized-state bundle of rays reflected by the transparent polarizer, wherein the liquid crystal display device is provided in a specific location so as to optically modulate the first linearly polarized-state bundle of rays that is incident thereon after passing through the reflective polarizer and to reflect the second linearly polarized-state bundle of rays obtained by the optical modulation towards the reflective polarizer so that the second linearly polarized-state bundle of rays is reflected by the reflective polarizer in the second direction, the reflective polarizer is provided in a specific location so as to allow the first linearly polarized-state bundle of rays to pass therethrough before optically modulated and to reflect the second linearly polarized-state bundle of rays obtained by the optical modulation towards the transparent polarizer, and the optical sensor is located on an optical path of the fourth linearly polarized-state bundle of rays reflected by the transparent polarizer in the first direction but not on an optical path of the third linearly polarized-state bundle of rays reflected by the reflective polarizer in the first direction.

5. The projection display apparatus according to claim 4, wherein the liquid crystal display device includes a plurality of pixel electrodes, a common electrode provided as facing the pixel electrodes, and a liquid crystal filled between the common electrode and each pixel electrode and the optical sensor outputs a detection signal when the optical sensor detects the fourth linearly polarized-state bundle of rays reflected by the transparent polarizer.

6. The projection display apparatus according to claim 5 further comprising:

a liquid crystal driver to receive the input video signal, reverse a polarity of the video signal with respect to a reference voltage for each vertical period of the images, supply the polarity-reversed video signal to the pixel electrodes, and output a polarity switching signal for each vertical period of the images;

a detector to obtain a positive maximum level and a negative maximum level of the detection signal for each vertical period based on the polarity switching signal and perform subtraction between the positive and negative maximum levels, thus outputting a differential signal that indicates a difference between the maximum levels; and an adjuster, responsive to the differential signal and a prior common-electrode voltage to be supplied to the common electrode and obtained for a previous vertical period, to subtract the difference from the prior common-electrode voltage when the difference carries a positive polarity, and to add the difference to the prior common-electrode voltage when the difference carries a negative polarity, thus obtaining an adjusted common-electrode voltage for the common electrode.

7. The projection display apparatus according to claim 6, wherein the liquid crystal driver changes timing of outputting the polarity switching signal to determine a zone of each image for which the adjusted common-electrode voltage is to be obtained.

8. The projection display apparatus according to claim 6 further comprising:
a controller to control the adjuster for obtaining the adjusted common-electrode voltage for the common electrode; and
a memory to store data on the adjusted common-electrode voltage,
wherein, in response to a projection-halt signal to halt projection and displaying of the images, the controller supplies a display command signal to the liquid crystal driver so that the liquid crystal driver supplies a video signal to the liquid crystal display device to display a specific image and controls the memory to store the data when the difference becomes zero for the specific image.

9. The projection display apparatus according to claim 8 wherein the controller retrieves the data on the adjusted common-electrode voltage from the memory for projection of an image that is to be displayed at first when the projection display apparatus is turned on.

10. The projection display apparatus according to claim 6 further comprising a filter to remove signal components from the differential signal, the signal components being involved in a frequency range that corresponds to flickers originated from the light source.

11. An image projection method for projecting images onto a screen by using a projection display apparatus equipped with a liquid crystal display device having pixel electrodes and a common electrode provided as facing the pixel electrodes, a liquid crystal driver for driving the liquid crystal display device and outputting a polarity switching signal for each vertical period of the images, and an optical sensor for outputting a detection signal when detecting a first light component optically modulated by the liquid crystal display device, the first light component being not used for projecting the images and being originated from light incident on the liquid crystal display device via an optical component by which a second light component is reflected to be eliminated from the light so as not to be optically modulated, the optical sensor being located on an optical path of the optically modulated first light component but not on an optical path of the reflected second light component not optically modulated, the method comprising the steps of:
separating the detection signal that is output by the optical sensor when the optically modulated first light component is detected by the optical sensor into a detection signal component in a positive side in polarity and another detection signal component in a negative side in polarity for each vertical period based on the polarity switching signal;
obtaining peak levels of the detection signal components to output a differential signal that indicates a difference between the peak levels;
calculating an adjusted common-electrode voltage to be supplied to the common electrode of the liquid crystal display device;
supplying the adjusted common-electrode voltage to the common electrode for projecting the images onto the screen,
wherein the adjusted common-electrode voltage is calculated with the differential signal and a prior common-electrode voltage calculated for a previous vertical period.

12. An image projection method for projecting images onto a screen by using a projection display apparatus equipped with a liquid crystal display device for modulation of incident light and having pixel electrodes and a common electrode provided as facing the pixel electrodes, an optical sensor for outputting a detection signal when detecting a first light component optically modulated by the liquid crystal display device, the first light component being not used for projecting the images and being originated from light incident on the liquid crystal display device via an optical component by which a second light component is reflected to be eliminated from the light so as not to be optically modulated, the optical sensor being located on a optical path of the optically modulated first light component but not on an optical path of the reflected second light component not optically modulated, and a memory for storing data based on the detection signal and related to a common-electrode voltage to be supplied to the common electrode, the method comprising the steps of:
separating the detection signal that is output by the optical sensor when the optically modulated first light component is detected by the optical sensor into a detection signal component in a positive side in polarity and another detection signal component in a negative side in polarity for each vertical period based on the polarity switching signal;
obtaining peak levels of the detection signal components to output a differential signal that indicates a difference between the peak levels;
obtaining a first common-electrode adjusting voltage for the common electrode when the projection display apparatus is turned on for an m-th time (m being an integer of 1 or more);
obtaining a second common-electrode adjusting voltage for the common electrode when the projection display apparatus is turned off for the m-th time;
obtaining a variant of a common-electrode adjusting voltage from a difference between the first and second common-electrode adjusting voltages, the variant of the common-electrode voltage thus obtained being stored in the memory;
obtaining a third common-electrode adjusting voltage for the common electrode when the projection display apparatus is turned on for a (m+1)-th time, each of the first, second and third common-electrode adjusting voltages being calculated with the differential signal and a prior common-electrode voltage calculated for a previous vertical period;
adding the variant of the common-electrode adjusting voltage stored in the memory to the third common-electrode adjusting voltage, the third common-electrode adjusting voltage thus added with the variant being set as a common-electrode voltage to be supplied to the common electrode; and
supplying the set common-electrode voltage to the common electrode of the liquid crystal display device for projecting the images onto the screen.

13. The image projection method according to claim 12, wherein each of the steps of obtaining the first, second and third common-electrode adjusting voltages includes the steps of:
a first flicker detecting step of adding a voltage change of the common-electrode voltage during flicker detection to a currently set common-electrode adjusting voltage stored in the memory and supplying a voltage thus obtained by addition to the common electrode of the liquid crystal display device, thus detecting a first flicker level at the optical sensor;
a second flicker detecting step of subtracting the voltage change of the common-electrode voltage during flicker detection from the currently set common-electrode adjusting voltage and supplying a voltage thus obtained by subtraction to the common electrode, thus detecting a second flicker level at the optical sensor; and a voltage adjusting step of comparing the first and second flicker levels to each other, subtracting a specific voltage from the common-electrode voltage to be supplied to the common electrode when the first flicker level is higher than the second flicker level, thus setting a voltage thus obtained by subtraction as the common-electrode voltage, adding the specific voltage to the common-electrode voltage to be supplied to the common electrode when the first flicker level is lower than the second flicker level, thus setting a voltage thus obtained by addition as the common-electrode voltage, and letting the common-electrode voltage as not being updated when the first and second flicker levels are equal to each other, the specific voltage being stored in the memory and carrying a voltage level to be added or subtracted depending on the comparison of the first and second flicker levels, wherein the first and second flicker detecting steps and the voltage adjusting step are repeated for a specific number of times to obtain an appropriate common-electrode voltage.

* * * * *